(12) United States Patent
Yokoyama et al.

(10) Patent No.: US 7,004,551 B2
(45) Date of Patent: Feb. 28, 2006

(54) VEHICULAR MOTOR-DRIVEN BRAKE DEVICE

(75) Inventors: Takahisa Yokoyama, Anjo (JP); Takayuki Takeshita, Anjo (JP); Haruo Arakawa, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/931,968

(22) Filed: Sep. 2, 2004

(65) Prior Publication Data

US 2005/0029860 A1 Feb. 10, 2005

Related U.S. Application Data

(62) Division of application No. 10/419,240, filed on Apr. 21, 2003.

(30) Foreign Application Priority Data

Apr. 24, 2002 (JP) .............................. 2002-122353

(51) Int. Cl.
*B60T 8/42* (2006.01)
(52) U.S. Cl. .................. 303/115.2; 303/162; 303/113.1
(58) Field of Classification Search .................. 303/10, 303/189, 118.2, 162, 113.1; 60/545, 534, 60/585, 592, 538
See application file for complete search history.

(56) References Cited

U.S. PATENT DOCUMENTS

| 4,998,782 | A | * | 3/1991 | Thatcher et al. ............ 303/142 |
|---|---|---|---|---|
| 5,054,861 | A | | 10/1991 | Resch |
| 5,722,744 | A | | 3/1998 | Kupfer et al. |
| 6,007,160 | A | * | 12/1999 | Lubbers et al. .......... 303/114.1 |
| 6,070,949 | A | | 6/2000 | Hariu et al. |
| 6,315,370 | B1 | | 11/2001 | Feigel et al. |
| 6,328,388 | B1 | | 12/2001 | Mohr et al. |
| 6,467,266 | B1 | * | 10/2002 | Kanazawa et al. ............ 60/552 |
| 6,604,795 | B1 | * | 8/2003 | Isono et al. .................... 303/11 |
| 6,844,812 | B1 | * | 1/2005 | Yokoyama et al. .......... 340/453 |
| 2001/0033106 | A1 | * | 10/2001 | Shirai et al. ................. 303/177 |
| 2002/0084691 | A1 | * | 7/2002 | Isono et al. .................... 303/10 |
| 2002/0084693 | A1 | | 7/2002 | Isono et al. |
| 2003/0038541 | A1 | | 2/2003 | Suzuki et al. |

FOREIGN PATENT DOCUMENTS

| JP | A-6-183330 | 7/1994 |
|---|---|---|
| JP | A-11-20645 | 1/1999 |

* cited by examiner

*Primary Examiner*—Devon C. Kramer
(74) *Attorney, Agent, or Firm*—Posz Law Group, PLC

(57) ABSTRACT

A vehicular motor-driven brake apparatus includes an open circuit in which reciprocation of a master cylinder generating a brake pressure is caused by an actuator that operates according to a pedal operation amount, and brake fluid discharged from a wheel cylinder during pressure decrease is directly returned to a master reservoir subject to atmospheric pressure. A fluid amount replenishment control is executed during pressure increase of the master cylinder in which a master stroke is returned for only a predetermined time by operation of the actuator, and thus brake fluid is sucked up from the master reservoir to the master cylinder. Accordingly, when an ABS control continues for a long time period, even if the brake pedal is being depressed, reduced pressure brake fluid in the master cylinder is sucked up. Therefore, there is no limit to pressure decrease, and bottoming-out of the master cylinder does not occur.

3 Claims, 11 Drawing Sheets

VEHICULAR MOTOR-DRIVEN BRAKE DEVICE

CROSS REFERENCE TO RELATED APPLICATION

This application is a divisional application of U.S. patent application Ser. No. 10/419,240, filed Apr. 21, 2003 which is based on and incorporates herein by reference Japanese Patent Application No. 2002-122353 filed on Apr. 24, 2002.

FIELD OF THE INVENTION

The present invention relates to a vehicular motor-driven brake device in which a master cylinder and a brake pedal are physically separated.

BACKGROUND OF THE INVENTION

Conventionally, a so-called closed circuit pumpless brake system of an ABS control device is known in which, in place of using a brake fluid recirculation pump when reducing pressure of a wheel cylinder during ABS control, brake fluid is temporarily stored in a reservoir provided in a conduit at a time of reducing pressure, and when pressure of a master cylinder is reduced along with release of a brake pedal, the brake fluid is recirculated from the reservoir to the master cylinder (Japanese Patent Laid-Open Publication No. Hei. 11-20645). In addition, this publication also discloses a so-called open circuit pumpless brake system in which, brake fluid that is discharged at the time of pressure decrease of the wheel cylinder, is directly recirculated to a master reservoir.

In the above mentioned pumpless ABS control device, for example, when a coefficient of friction on a road is low (e.g., when a road surface is prone to cause slipping), braking continues for a long time period if the brake pedal is depressed for a long time by a driver when a vehicle is travelling at a relatively high speed, there is a possibility that execution of accurate ABS control will cease.

In other words, when the aforementioned closed circuit is adopted in the pumpless ABS control device and the ABS control is continued for a long time, the reservoir becomes full. Therefore, it is no longer possible to further reduce brake fluid pressure. In this case, a master cylinder pressure in accordance with a depression amount of the brake pedal is applied to the wheel cylinder directly. Accordingly, it is possible that wheels may be locked.

In the case that the aforementioned open circuit is adopted in the pumpless ABS control device, there is no limit to a recirculation of fluid at the time of pressure decrease, as is the case with the closed circuit. However, a limit of the depression of the brake pedal corresponds to a limit for pressure increase of the master cylinder pressure. Namely, a stroke of the master cylinder is insufficient, and thus there is a possibility that it will become impossible to execute the ABS control over a long period due to the occurrence of bottoming-out of the master cylinder.

On the other hand, in Japanese Patent Laid-Open Publication No. Hei. 06-183330, a motor-driven brake device is disclosed in which a master cylinder pressure is generated by a piston of a master cylinder being directly acted upon and moved in accordance with a depression force of a brake pedal. In the motor-driven brake device, when the depression of the brake pedal is released, the master cylinder pressure is also released accordingly. Accordingly, when the ABS control is executed using the motor-driven brake device, it is essential for a driver to release depression of the brake pedal when pressure decrease control of the ABS control is executed. As a result, the motor-driven brake device is impractical.

In view of the foregoing circumstances, it is an object of the present invention to provide a motor-driven brake device in which insufficiency of a stroke of a master cylinder does not cause bottoming-out when an ABS control continues for a long time period, even if when a brake pedal is being depressed.

In addition, a further object of the present invention is to provide a motor-driven brake device that can suitably reduce a pressure of a wheel cylinder when an ABS control continues for a long time period, even if a brake pedal is being depressed.

SUMMARY OF THE INVENTION

According to a first aspect of the present invention, in a motor-driven brake device, a stroke length of a piston of a master cylinder is set so as to be larger than a brake pedal depression amount.

According to the first aspect, a stroke of the piston of the master cylinder for generating a brake pressure is caused by movement of an actuator in accordance with a brake pedal operation amount. The stroke length is set so as to be larger than the brake pedal depression amount. Accordingly, even if an ABS control is continued for a long time period in accordance with the brake pedal being depressed for a long time, it is possible to avoid occurrence of bottoming-out caused by the stroke of the master cylinder being insufficient.

In this case, a capacity of a reservoir is set to a capacity that equals a capacity of the master cylinder minus a capacity of the wheel cylinder and a capacity of a conduit connected from the master cylinder to the wheel cylinder. Accordingly, it is possible for the reservoir to sufficiently store brake fluid discharged through a pressure decrease valve in accordance with the capacity of the master cylinder having the large stroke length. Therefore, even if the ABS control is continued for a long time period, it is possible to avoid a storage limit of the reservoir for storing the brake fluid discharged when the pressure decrease control is executed.

According to a second aspect of the present invention, a motor-driven brake device is provided with a conduit for returning brake fluid discharged through a pressure decrease valve to a master reservoir when a wheel cylinder pressure decreases.

According to the second aspect, an open circuit is provided in which reciprocation of a master cylinder generating a brake pressure is performed by an actuator that operates according to a brake pedal operation amount, and brake fluid discharged from a wheel cylinder during pressure decrease is directly returned to the master reservoir that is subject to atmospheric pressure. Accordingly, even in the case that an ABS control continues for a long time period in accordance with the brake pedal being depressed, a storage limit of the reservoir during the pressure decrease control is not generated. In other words, while the brake pedal is being depressed, it is possible to constantly decrease the brake pressure. Thus it is possible to continue the ABS control appropriately.

According to a third aspect of the present invention, a motor-driven brake device is provided with a control portion that causes the actuator to execute a fluid amount replenishment control such that: a rod is moved such that a return stroke is performed in a predetermined time and in a direction that decreases a master cylinder pressure, during pressure increase of a master cylinder; and following this, the rod is moved in a direction that increases pressure of the master cylinder.

According to the third aspect, the fluid amount replenishment control is executed in which: reciprocation of the piston of the master cylinder generating a brake pressure is caused by the actuator that operates in accordance with a brake pedal operation amount. Further, the return stroke of the piston is executed for only a predetermined time by operation of the actuator. Thus, brake fluid discharged from the wheel cylinder during pressure decrease is recirculated to the master cylinder. Accordingly, even in the case that an ABS control continues for a long time period in accordance with the brake pedal being depressed for a long time, it is possible to avoid occurrence of bottoming-out due to the stroke of the piston of master cylinder being insufficient. Further, it is possible to prevent the reservoir from reaching the storage limit.

In addition, in the fluid amount replenishment control, a driving current and a driving time of an actuator for executing the return stroke may be defined in accordance with a stroke length of the piston of the master cylinder.

According to a fourth aspect of the present invention, a motor-driven brake device is provided with a control portion that causes an actuator to execute a fluid amount replenishment control such that: when a difference between a detection value of a stroke sensor and a stroke length of a piston estimated from a driving current of an actuator exceeds a predetermined threshold value, a rod is moved such that a return stroke of the piston is performed within the master cylinder in a predetermined time and in a direction that decreases a master cylinder pressure, during pressure increase of the master cylinder; and following this, the rod is moved in a direction that increases pressure of the master cylinder.

According to the fourth aspect, the fluid amount replenishment control is executed such that reciprocation of the master cylinder generating a brake pressure is caused by the actuator that operates in accordance with a brake pedal operation amount. The return stroke of the piston is performed in only a predetermined time by operation of the actuator when the difference between the detected value of an actual stroke of the piston of the master cylinder and the estimated stroke length estimated from the driving current of the actuator exceeds the predetermined threshold value. Accordingly, even in the case that air is mixed within the conduit, it is possible to reliably transmit pressure generated in the master cylinder to a wheel cylinder, by replenishing brake fluid in the master cylinder while the brake pedal is in a depressed state.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
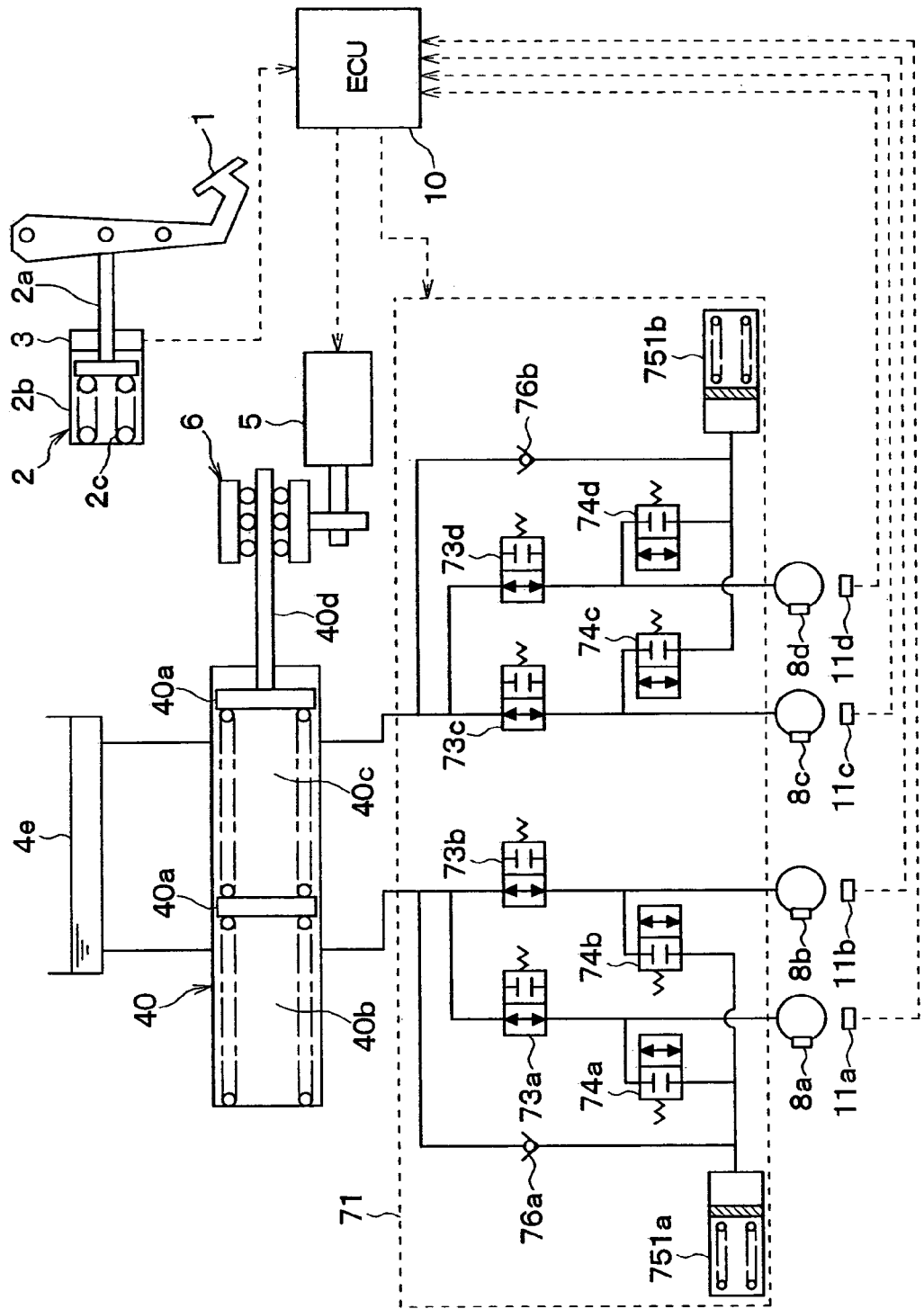
FIG. 1 is a schematical view showing an overall structure of a motor-driven brake device according to a first embodiment of the present invention.

The present invention will be described further with reference to various embodiments in the drawings.

First Embodiment

Hereinafter, a first embodiment of the present invention will be explained with reference to the drawings. The first embodiment is a motor-driven brake device in which the present invention has been applied to a pumpless ABS device. In particular, the motor-driven brake device is such that a piston of a master cylinder (hereinafter referred to as "M/C") is reciprocated by a motor, and a stroke length of this reciprocation is longer than that of a normally used M/C. The overall structure of the motor-driven brake device is shown in FIG. 1.

As shown in FIG. 1, the motor-driven brake device according to the first embodiment is provided with a brake pedal 1 operated in accordance with a brake requirement of a driver, a stroke simulator 2, and a pedal operation amount (e.g., a depression force, a stroke) sensor 3. The stroke simulator 2 is configured from a piston 2a that is reciprocated by depression of the brake pedal 1, a cylinder 2b slid by the piston 2a, and a spring 2c disposed within the cylinder 2b. The brake pedal 1 and the piston 2a are connected. When the brake pedal 1 is depressed, counter force resulting from spring force from the spring 2c and in accordance with a pedal operation amount and a stroke are applied to the brake pedal 1. The stroke simulator 2 is also provided with a pedal operation amount sensor 3 as a pedal operation amount detection portion. The pedal operation amount sensor 3 detects the pedal operation amount, for example, a pedal depression force based upon the counter force of the spring 2c. Hereinafter, the pedal operation amount sensor 3 will simply be referred to as a "depression force sensor".

The motor-driven brake device is also provided with an M/C 40 isolated from the brake pedal 1, a motor 5 as an actuator, a gear mechanism 6, an ABS actuator 71, and wheel cylinders (hereinafter each wheel cylinder will be referred to as "W/C") 8a to 8d corresponding to each vehicle wheel (not shown).

The M/C 40 is divided into a primary chamber 40b and a secondary chamber 40c by a master piston 40a, and is configured such that the primary chamber 40b and the secondary chamber 40c are connected to a first piping system and a second piping system, respectively. The first piping system is arranged so as to connect a left-front wheel (W/C 8a) and a right-rear wheel (W/C 8b). The second piping system is arranged so as to connect with a left-rear wheel (W/C 8c) and a right-front wheel (W/C 8d). It should be noted that the wheel combination may consist of the two front wheels and the two rear wheels.

Each of the chambers 40b and 40c is longer than a normally used M/C. Accordingly, a stroke length of the piston 2a of the M/C 40 is set so as to be longer than a stroke length of the piston 2a of the stroke simulator 2 that accords with a depression amount of the brake pedal 1. Therefore, a capacity of a pressure chamber of the M/C 40 is set to be larger than normal. The M/C 40 configured as mentioned above allows continuous ABS operation due to an M/C stroke (hereinafter, the term "M/C stroke" will be taken to refer to the "stroke of the piston of the M/C") being sufficient length to inhibit occurrence of bottoming out, even in the case that ABS control is executed over a long time period with decrease of a wheel cylinder pressure being continued.

The master piston 40a is moved along with movement in an axial direction of a piston rod 40d. A brake fluid pressure (hereinafter referred to as "M/C pressure") of each chamber 40b and 40c is increased and thus a brake fluid pressure of each W/C (hereinafter referred to as "W/C pressure") is increased. The M/C 40 is provided with a master reservoir 4e and is configured such that each of the respective chambers 40b and 40c is connected with the master reservoir 4e.

The motor 5 acting as an actuator for the M/C 40 generates rotary driving force (output) in accordance with a depression force indication current value corresponding to target braking force calculated by an ECU 10 based upon a depression force detection value from the depression force sensor 3. The gear mechanism 6 includes a ball screw, a rack-and-pinion gear, and the like, and converts rotary driving force of the motor 5 into straight movement. The aforementioned piston rod 40d is driven by the gear mechanism 6. When the rotary force of the motor 5 is converted to straight movement, the piston rod 40d is driven in accordance with force based on the straight movement. Namely, in the motor-driven brake device of the present embodiment, the M/C pressure is generated in accordance with the rotary driving force of the motor 5, and the W/C pressure is generated in accordance with this M/C pressure. In addition, the gear mechanism 6 may be provided with a speed-reduction gear and a speed-increasing gear for regulating a requisite motor torque and requisite axial force.

The ABS actuator 71 is a normal ABS actuator and is provided with pressure increase valves 73a to 73d and pressure decrease valves 74a to 74d for each of the respective wheels, and further respective reservoirs 751a and 751b and respective check valves 76a and 76b in the first and the second piping systems. Hereinafter, a configuration and operation of the ABS actuator 71 will be explained using the left front wheel of the first piping system as an example. It should be noted that the same operation is executed with respect to the other wheels, namely, the right rear wheel of the first piping system and the right rear wheel and the left rear wheel of the second piping system. Accordingly, an explanation for these wheels will be omitted here.

The pressure increase valve 73a acting as a two position valve is connected between the primary chamber 40b of the M/C 40 and the W/C 8a. The ECU 10 controls the pressure increase valve 73a so as to switch an opened state when de-energized, and a closed state when energized. The brake fluid pressure generated by the M/C 40 is transmitted to the W/C 8a during the opened state of the pressure increase valve 73a. The pressure decrease valve 74a is provided as a two position valve at a side of the W/C 8a (i.e., a downstream side) of the pressure increase valve 73a. The ECU 10 controls the pressure decrease valve 74a so as to switch a closed state when de-energized, and an opened state when energized. The reservoir 751a is connected to a downstream side of the pressure decrease valve 74a (i.e., an opposite side to the W/C 8a). The pressure decrease valve 74a is switched into the opened state when pressure decrease is being executed in the ABS control, and discharges brake fluid within the WIC 8a to the reservoir 751a. Accordingly, the pressure decrease valve 74a operates so as to reduce the W/C pressure. It should be noted that a capacity of the reservoir 751a is larger than a capacity of a reservoir used in a normal ABS actuator and corresponds to a capacity of the M/C 40. More specifically, the reservoir 751a is provided with a capacity equal to a capacity of the primary chamber 40b minus a capacity of the first piping system that includes capacities of the W/Cs 8a and 8b.

A portion of a conduit disposed between the pressure increase valve 73a and the M/C 40 (i.e., an upstream side of the pressure increase valve 73a) and the reservoir 751a are connected through the check valve 76a. In a pressure increase process of the M/C pressure during a braking operation, brake fluid is not moved to the reservoir 751a due to the check value 76a. Instead, once the braking operation is completed, the piston rod 40d (i.e., the master piston 40a) is returned by the motor 5 so that the capacity of the primary chamber 40d becomes larger. Accordingly, brake fluid stored in the reservoir 751a is evacuated via the check valve 76a and returned to the primary chamber 40b, so as to prepare for the following pressure increase of the M/C pressure.

The other pressure increase valves 73b to 73d and the other pressure decrease valves 74b to 74d are configured in the same manner and execute the same operation as the pressure increase valve 73a and the pressure decrease valve 74a described above. Further, the reservoir 751b and the check valve 76b of the second piping system have the same configuration and execute the same operation as the reservoir 751a and the check valve 76a described above. It should be noted that the ECU 10 executes duty control to the pressure increase valves 73a to 73d and the pressure decrease valves 74a to 74d so that respective W/C pressures are lineally controlled.

The motor-driven brake device according to the first embodiment is provided with the ECU 10 for driving the motor 5 and the ABS actuator 71. A detection signal of the depression force sensor 3, respective vehicle wheel speed signals from vehicle wheel speed sensors 11a to 11d provided at each of the wheels, and signals from each of various other sensors, are respectively input to the ECU 10. The ECU 10 executes various calculations based on each of the input signals and outputs respective command values derived based on these calculations as drive signals for the motor 5 and the ABS actuator 71.

Next, operation of the motor-driven brake device configured in the manner described above will now be explained with reference to a time chart of FIG. 2.

When the driver depresses the brake pedal 1, the ECU 10 reads target braking force that the vehicle wheels need to generate from a pre-set map. The target braking force accords with the pedal depression force that corresponds to the output signal of the depression force sensor 3. The motor drive signal corresponding to the target braking force is supplied to the motor 5. A stroke of the piston rod 40d that is proportional to the depression force of the brake pedal 1 is generated by the drive of the motor 5. Along with this stroke, the pressures of the primary chamber 40a and the secondary chamber 40b increase, namely, the M/C pressure increases. Accordingly, the W/C pressure increases because the pressure decrease valves 74a to 74d that are de-energized, namely, that are switched in the closed state, and the pressure increase valve 73a to 73d that are de-energized, namely, that are switched in the opened state. Therefore, braking force is generated with respect to each of the vehicle wheels and the vehicle speed reduces.

The ECU 10 calculates a vehicle slip ratio (i.e., vehicle slip ratio=slip speed/vehicle speed=(vehicle speed−vehicle wheel speed)/vehicle speed) based on the vehicle wheel speed signal from each of the vehicle wheel speed sensors 11a to 11d. In the case the this slip ratio exceeds a pre-set target slip ratio, the ABS control begins.

The ABS control repeats (A) a pressure decrease mode, (B) a pressure increase control mode, and (C) a pulse pressure increase/maintenance mode as one cycle. FIG. 2 shows time period when the ABS control is executed, and respective periods in which each of the modes (A) to (C) is executed.

(A) In the pressure decrease mode, the pressure increase valve 73a is set to the closed state (close) and the pressure decrease valve 74a is set to the opened state (open) when the calculated slip target exceeds the target slip ratio by, for example, 15%. It is assumed that at the time the vehicle wheel is prone to a locked state. Accordingly, the W/C pressure decreases and the vehicle wheel speed begins to increase. At this point, the pressure decrease valve 74a is set to the closed state (close) and the pressure decrease mode terminates. It should be noted that, with regard to executing the pressure decrease mode for the first time following the start of the braking operation, an additional execution condition is added that requires the slip speed to exceed a predetermined value for execution of the pressure decrease mode. Accordingly, the ABS control is not executed unnecessarily due to momentary changes of a running condition.

(B) The pressure increase control mode begins at the same time as the pressure decrease mode terminates. In other words, when the pressure decrease mode terminates, the pressure decrease valve 74a is closed due to de-energization, and at the same time the pressure increase valve 73a switches from the closed state to the opened state. Following this, the pressure increase valve 73a is switched to closed state in a short period and opened state in a short period repeatedly. Namely, the vehicle wheel speed leaves the locked state and thus the W/C pressure is increased. FIG. 2 shows this repetition of the closed state and the opened state of the pressure increase valve 73a in simplified form.

At this time, an acceleration speed (i.e., a speed acceleration rate) of the vehicle wheel is calculated by the ECU 10 as a differential value of the output signal of the vehicle wheel speed sensor 11a. The acceleration speed changes from small to large, and from large to small along with change of the vehicle wheel speed during the pressure increase control mode. When the vehicle wheel acceleration speed has become smaller or the increase ratio has become zero, the ECU 10 terminates the pressure increase control mode and processing moves to the following pulse pressure increase/maintenance mode.

(C) In the pulse pressure increase/maintenance mode, pulse current is supplied to the pressure increase valve 73a while the pressure decrease valve 74a is maintained in the closed state, which is the de-energized state. Accordingly, the W/C pressure of the W/C 8a repeatedly switches between increasing when the pressure increase valve 73a is energized and being maintained when the pressure increase valve 73a is de-energized. During this time, the W/C pressure increases in a step-like manner so as to gradually approach the M/C pressure. Since an increase in the W/C pressure causes to an increase in the braking force, the vehicle wheel speed decreases. When the slip ratio increases still further and exceeds the aforementioned target slip ratio by 15%, the pressure increase valve 73a is switched in the closed state and the pressure decrease valve 74a is switched in the opened state. Accordingly, the pressure decrease mode described above begins again.

Following this, the ABS control continues through repeated execution of series of modes, namely, (A) the pressure decrease mode, (B) the pressure increase control mode and (C) the pulse pressure increase/maintenance mode.

It should be noted that during the ABS control, the M/C stroke length does not change during the pressure decrease mode since the pressure closed valve 73a is interrupted. In the pressure increase control mode and the pulse pressure increase/maintenance mode, the M/C stroke length increases when the pressure increase valve 73a enters the opened state. In other words, during the ABS control, although the M/C stroke length increases it does not decrease. Accordingly, if the maximum stroke length of the M/C 40 is set to be short like the normal M/C stroke limit indicated by an SL line in FIG. 2, when depression of the brake pedal 1 is continued, a bottoming-out state occurs at a time point when a remaining stroke length of the piston 2a becomes zero and decrease and increase of the W/C pressure becomes impossible. Therefore, execution of the ABS control becomes impossible.

Figure 2:
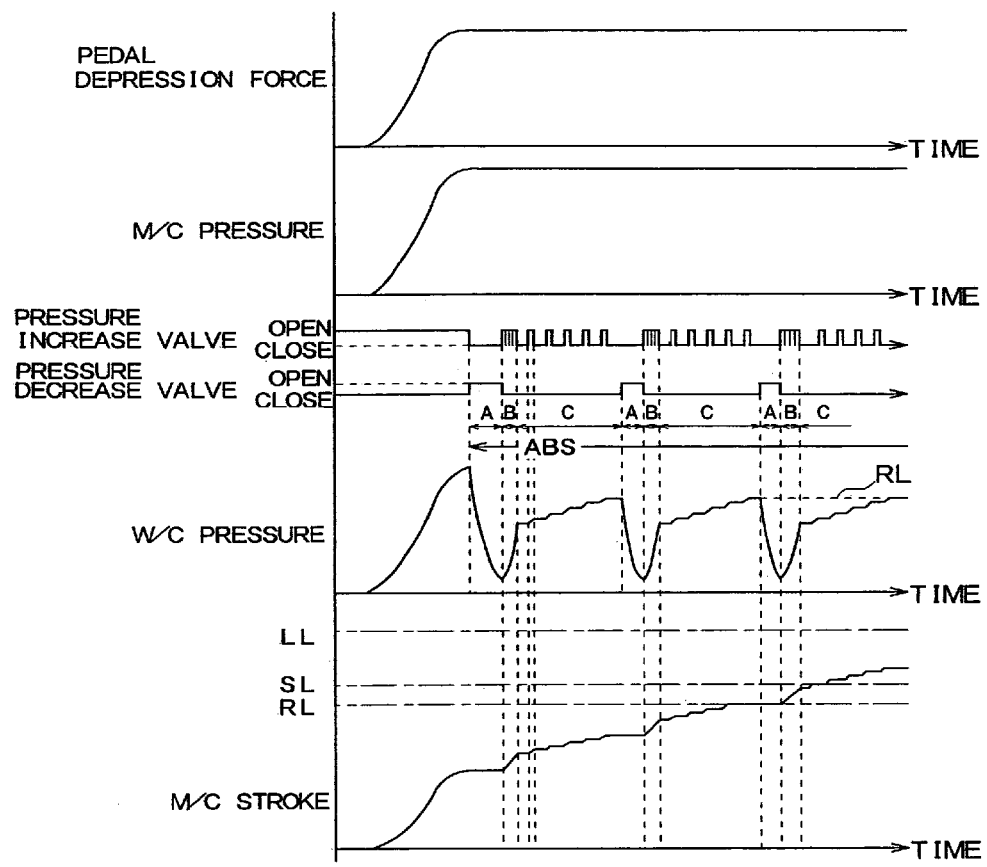
FIG. 2 is a time chart showing an operation of the motor-driven brake device according to the first embodiment of the present invention.

However, according to the first embodiment, the stroke of the M/C 40 is longer than that of a normal master cylinder, and thus it is possible to raise the M/C stroke limit (indicated by the line LL in FIG. 2). Accordingly, even if the ABS control continues for a long time, bottoming out of the M/C stroke does not occur and it is possible to prevent the ABS control from becoming impossible. Further, the M/C 40 is not directly reciprocated by depression of the brake pedal 1. Instead, the M/C 40 is reciprocated by the motor 5 that is controlled based on the signal of the depression force sensor 3. Therefore, in order to ensure the length of the M/C stroke, it is not necessary to extend the length of the brake pedal 1 itself.

Further, if the reservoir capacity is small, the reservoir capacity limits at the position indicated by the line RL in FIG. 2, and it soon becomes impossible to store pressure decrease brake fluid. From this point, decrease of the W/C pressure is impossible. In other words, execution of the ABS control becomes impossible. On the contrary, according to the first embodiment, the reservoirs 751a and 751b each of which has a capacity increased in accordance with the capacity of each of the chambers 40b and 40c of the M/C 40 are used. Accordingly, there is sufficient capacity to adequately store the brake fluid evacuated by repeated execution of decrease of the W/C pressure during continuation of the ABS control. Therefore, it is possible to continue the ABS control over a long time period without the ABS control being rendered inoperable.

Second Embodiment

Figure 3:
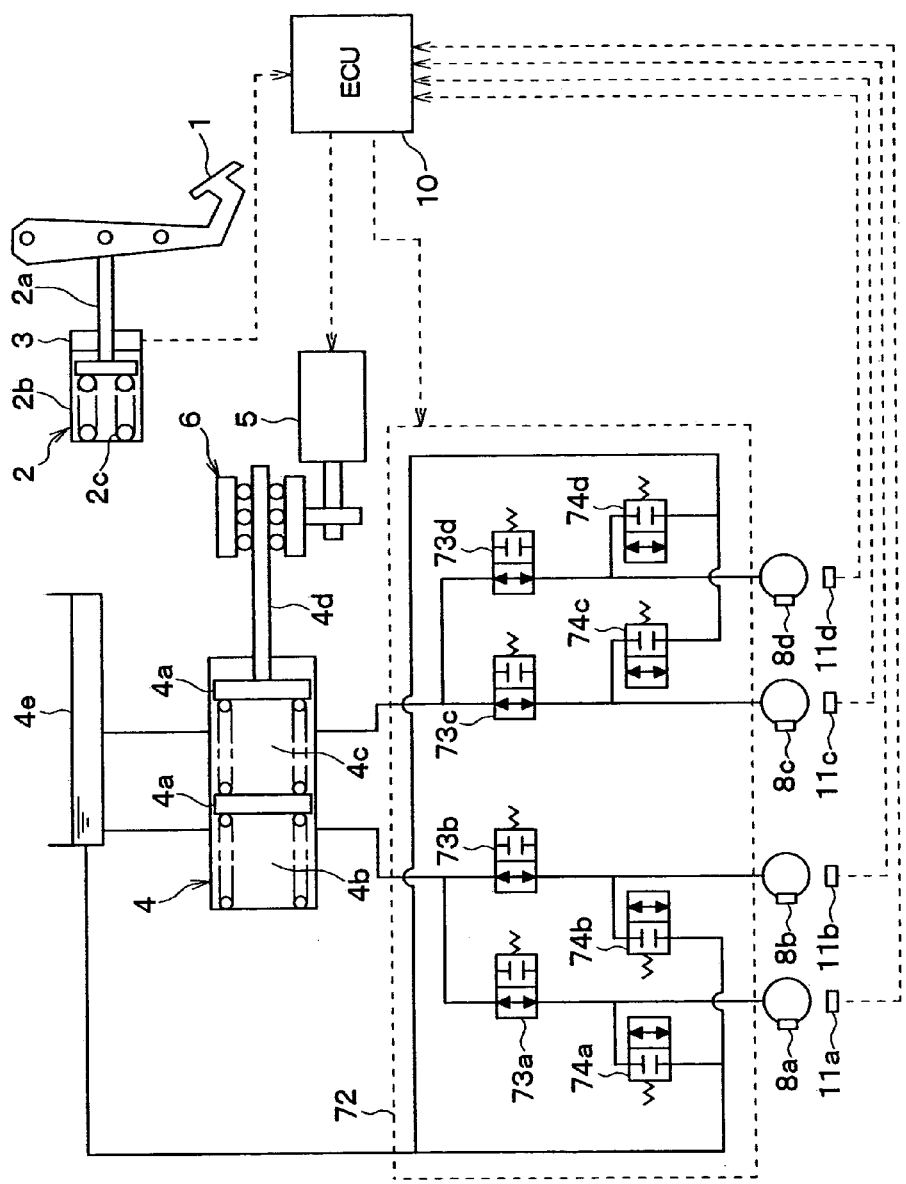
FIG. 3 is a schematical view showing an overall structure of a motor-driven brake device according to a second, a fourth and a sixth embodiments of the present invention.

Next, a second embodiment according to the present invention will now be explained with reference to the drawings. The second embodiment is a motor-driven brake device in which the present invention has been applied to a pumpless ABS device. In particular, the motor-driven brake device is provided with an open circuit that, when W/C pressure is reduced, directly returns brake fluid to a master reservoir connected to an M/C. The overall structure of the motor-driven brake device is shown in FIG. 3. Structural elements that are the same as those in the first embodiment are denoted by the same reference numerals. Explanation of these elements will be omitted here. It should be noted, however, that some structural elements with the same reference numerals perform a slightly different function to the equivalent elements in the first embodiment, and in this case an explanation will be provided.

As can be seen from FIG. 3, the motor-driven brake device according to the second embodiment is provided, like the first embodiment, with the brake pedal 1, the stroke simulator 2, the depression force sensor 3, the motor 5 and the gear mechanism 6.

An M/C 4 has a stroke length that is the same as a normal M/C. Accordingly, it is possible to use an M/C having a stroke length shorter than that of the M/C 40 of the first embodiment. A master reservoir 4e subject to an atmospheric pressure is connected to a primary chamber 4b and a secondary chamber 4c. Conduits are provided such that an open circuit is configured in which brake fluid discharged along with pressure decrease of each of the W/Cs 8a to 8d is returned directly to the master reservoir 4e.

An ABS actuator 72 is provided with the pressure increase valves 73a to 73d having the same structure and conduit connections as those of the first embodiment and the pressure decrease valves 74a to 74d that have the same structure as those of the first embodiment and are connected to a downstream side of the master reservoir 4e.

The W/Cs 8a to 8d and the vehicle wheel speed sensors 11a to 11d have the same structure as those of the first embodiment.

With regard to the ECU 10, the ABS actuator 72 is slightly different to that of the first embodiment. However, a control logic of the ECU 10 is the same as that of the first embodiment. In other words, when an ABS control is started, (A) the pressure decrease mode, (B) the pressure increase control mode and (C) the pulse pressure increase/maintenance mode are repeated based on the slip speed and a rate of change (the acceleration speed) of the vehicle wheel speed. However, a point different from the first embodiment during the W/C pressure is being reduced is such that the return destination for the brake fluid from the W/C 8a is the master reservoir 4e, rather than one of the reservoirs 751a or 751b provided within the ABS actuator 71 (FIG. 1). In other words, by setting the pressure decrease valve 74a to the opened state while the pressure increase valve 73a is maintained in the closed state, it is possible to return the brake fluid from the W/C 8a, which is subject to a pressure higher than atmospheric pressure, to the master reservoir 4e that is subject to atmospheric pressure. According to the open circuit, a pumpless ABS control device is configured.

Figure 4:
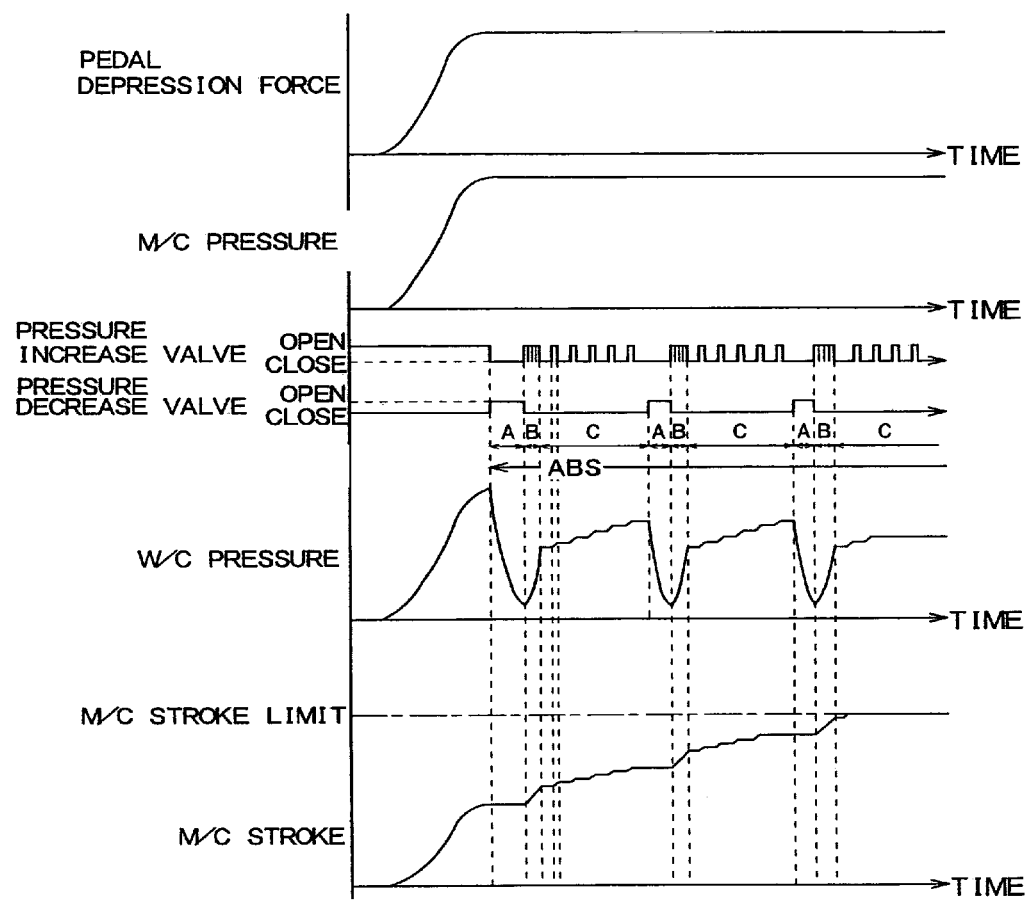
FIG. 4 is a time chart showing operation of the motor-driven brake device according to the second embodiment.

FIG. 4 is a time chart showing operation of the motor-driven brake device of the second embodiment. As indicated in FIG. 4, an operation state is the same as that of the first embodiment, and is based upon the same control logic as that illustrated in the time chart (FIG. 2) for the first embodiment. However, as shown in FIG. 4, it is possible to increase the W/C pressure up to a stroke limit of the M/C 4, and once the stroke limit has been reached the W/C pressure remains in a non-changing state.

Therefore, according to the second embodiment the M/C 4 is reciprocated by the motor 5, which is controlled based upon the signal of the depression force sensor 3, rather than being directly reciprocated by depression of brake pedal 1. Accordingly, the stroke length of the M/C can be set without any relationship to the rod 2a of the stroke simulator 2, and thus it is not necessary to lengthen the stroke of the brake pedal 1 itself in order to ensure the stroke length of the M/C.

In addition, according to the second embodiment the open circuit is utilized, and thus there is no limit to a fluid storage amount at the time of reducing the W/C pressure. Accordingly, even if the ABS control is continued for a long time decrease of the W/C pressure does not become impossible, and thus it is possible to prevent the vehicle wheels from being locked.

Third Embodiment

Figure 5:
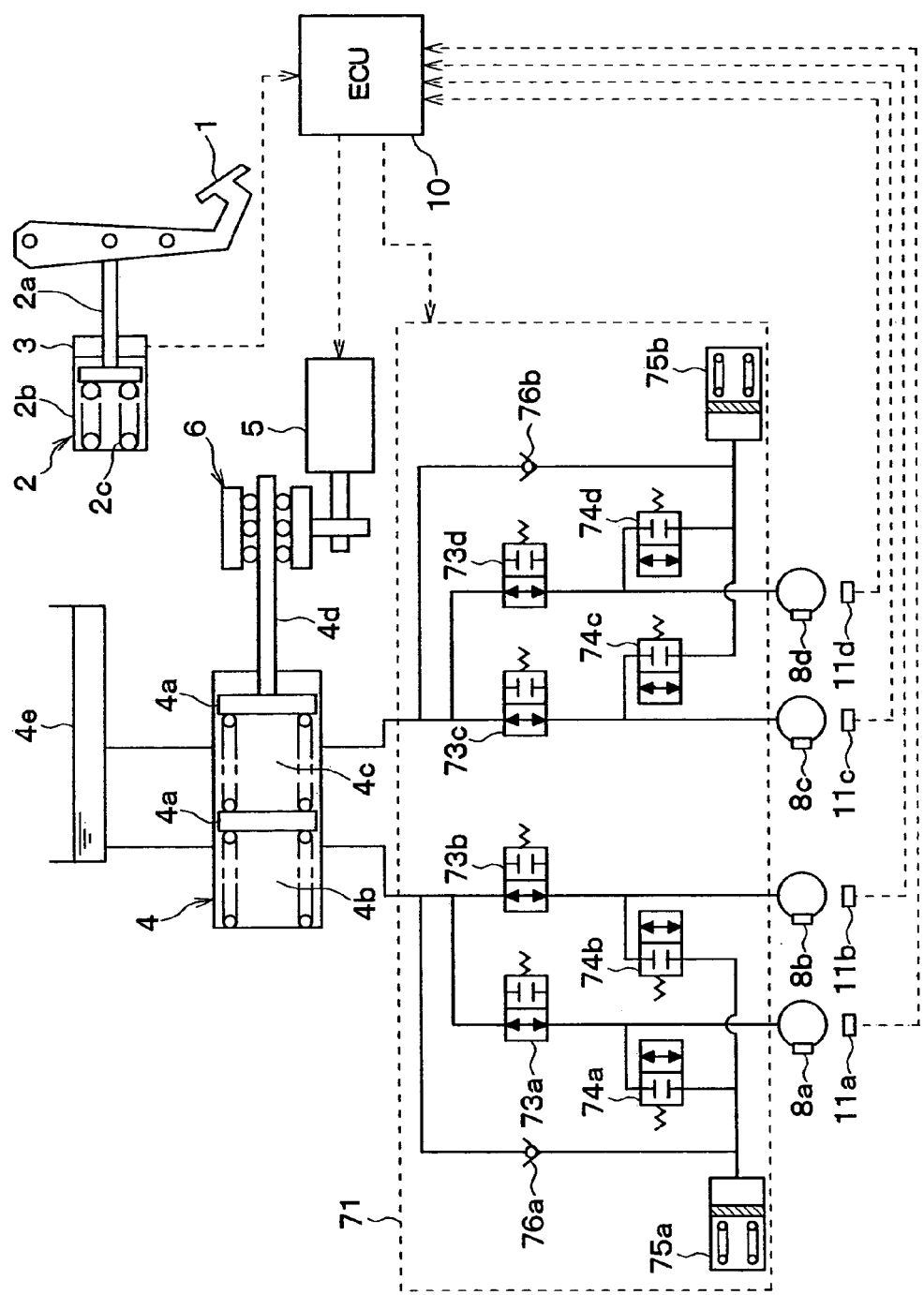
FIG. 5 is a schematical view showing an overall structure of a motor-driven brake device according to a third and a fifth embodiments of the present invention.

Next, a third embodiment according to the present invention will now be explained with reference to the drawings. The third embodiment is a motor-driven brake device in which the present invention has been applied to a pumpless ABS device. In particular, the motor-driven brake device differs from that of the first embodiment in that (D) a fluid amount replenishment control for returning brake fluid to an M/C is executed by returning a M/C stroke in a short-period in (C) the pulse pressure increase/maintenance mode. The overall structure of the motor-driven brake device is shown in FIG. 5. Structural elements that are the same as those in the first and second embodiments are denoted by the same reference numerals. Explanation of these elements will be omitted here. It should be noted, however, that some structural elements with the same reference numerals perform a slightly different function to the equivalent elements in the first and the second embodiment, and in this case an explanation will be provided.

As can be seen from FIG. 5, the motor-driven brake device according to the third embodiment is provided, like the first embodiment, with the brake pedal 1, the stroke simulator 2, the depression force sensor 3, the motor 5 and the gear mechanism 6.

The M/C 4 has a stroke length that is the same as that of the second embodiment. Accordingly, it is possible to use an M/C having a stroke length shorter than that of the M/C 40 of the first embodiment. The piping systems of the primary chamber 4b and the secondary chamber 4c are the same as those of the equivalent members of the first embodiment.

The ABS actuator 71 has the same structure as that of the first embodiment. However, reservoirs 75a and 75b may have normal capacities corresponding with the capacity of the M/C 4, similar to those of a normal ABS device.

The W/Cs 8a to 8d and the vehicle wheel speed sensors 11a to 11d have the same structure as those of the first and second embodiments.

A control logic of the ECU 10 of the third embodiment is the same as those of the first and second embodiments. That is, (A) the pressure decrease mode, (B) the pressure increase control mode, and (C) the pulse pressure increase/maintenance mode, which are the fundamental basis of the ABS control logic, are repeated. However, the control logic differs in that (D) the fluid amount replenishment control in which the M/C stroke returns in the short-period is executed during (C) the pulse pressure increase/maintenance mode. Hereinafter, an explanation will be given with reference to a flow chart of FIG. 6.

When an ignition of the vehicle is turned on, processing of the ECU 10 shown in the flow chart starts. A routine, described below, is then repeatedly executed each predetermined calculation period (e.g., 10 to 20 ms).

In step S100 it is determined whether the ABS control is presently being executed. In this case, as with the first and second embodiments, it is determined that the ABS control is being executed when the slip ratio calculated by the ECU 10 exceeds the pre-set target slip ratio. If NO is determined, the processing moves to 190. If YES is determined, the processing moves to 120.

At 110, it is determined whether all four wheels are in the pulse pressure increase/maintenance mode. This determination is executed by determining whether the slip ratio is in a state prior to reaching the target slip ratio following termination of the pressure increase control mode. If NO is determined, the processing moves to 190. If YES is determined, the processing moves to 120.

At 120, it is determined whether the pressure increase control mode is being executed. This determination is executed by determining whether the increase ratio of each of the wheel speeds, namely, the vehicle wheel acceleration speed, is equal to or above the predetermined value. If YES is determined, the processing moves to 190 since the pressure increase control mode is being executed and thus the fluid amount replenishment control is not executed. If NO is determined, the processing moves to 130. As a result of performing at 120, it is possible to prevent increase of the W/C pressure from becoming impossible due to the occurrence of M/C pressure decrease resulting from the M/C stroke returning during the pressure increase control mode.

In step S130 it is determined whether a post-termination elapsed time k since execution of the previous fluid amount replenishment control exceeds a predetermined value T1. This predetermined time T1 is set in advance and takes into account brake fluid stored in the W/C 8a and the reservoir 75a as a result of decrease of the W/C pressure. Accordingly, it is possible to start the next fluid amount replenishment control following execution of at least the pulse pressure increase/maintenance mode and the pressure decrease mode after termination of the previous fluid amount replenishment control during the ABS control. As a result of time setting of the predetermined time T1, it is possible to execute the fluid amount replenishment control during the pulse pressure increase/maintenance mode that restores braking force and prior to when the respective storage amounts of the reservoirs 75a and 75b and the like are used up. In the case that the determination result at 130 is NO, namely, k is less than or equal to T1, the processing moves to 190. If the determination result is YES, namely, K is greater than T1, the processing moves to 140.

At 140, the fluid amount replenishment control is executed and an increment of 1 is added to an execution time t of the fluid amount replenishment control. Next, in 150 it is determined whether the execution time t that corresponds a replenishment control elapsed time the elapsed time t that is a replenishment control exceeds a predetermined time T2. If NO is determined, namely, that the execution time t is equal to or larger than T2, it is taken that the fluid amount replenishment control is terminated and the processing moves to 190. If YES is determined, namely, the execution time t is less than T2, the processing moves to 160 and the fluid amount replenishment control is continued.

At 160, the pressure increase valves 73a to 73d of the four wheels are fixed in the closed state, namely, a maintained state. At 170, a current indication value of the motor 5 is set to −I2. This command value −I2 is, for example, set to around 10 [A], and the current is supplied to the motor 5. Accordingly, the M/C stroke is returned by reverse rotation of the motor 5. Therefore, brake fluid that has been stored in the reservoirs 75a and 75b during execution of the pressure decrease mode can be returned to the primary chamber 4b and the secondary chamber 4c via the check valves 76a and 76b.

At 180 the post-termination elapsed time k of the fluid amount replenishment control is reset to 0, and the processing returns to 100 and is repeated as mentioned above.

On the other hand, at 190, which is executed during decrease of the W/C pressure, an increment of 1 is added to the post-termination elapsed time k of the fluid amount replenishment control. At 200, the maintained state that fixes pressure of the pressure increase valves 73a to 73d of the four wheels is released, or in other words, the pressure increase valves 73a to 73d are set so as to be free to move opened state and closed state. At 210, the current indication value of the motor 5 is set to a depression force indication current value I1 determined in accordance with a depression force detection value. At 220 the execution time t of the fluid amount replenishment control is reset to zero, and then the processing returns to 100 and is repeated as mentioned above.

Figure 7:
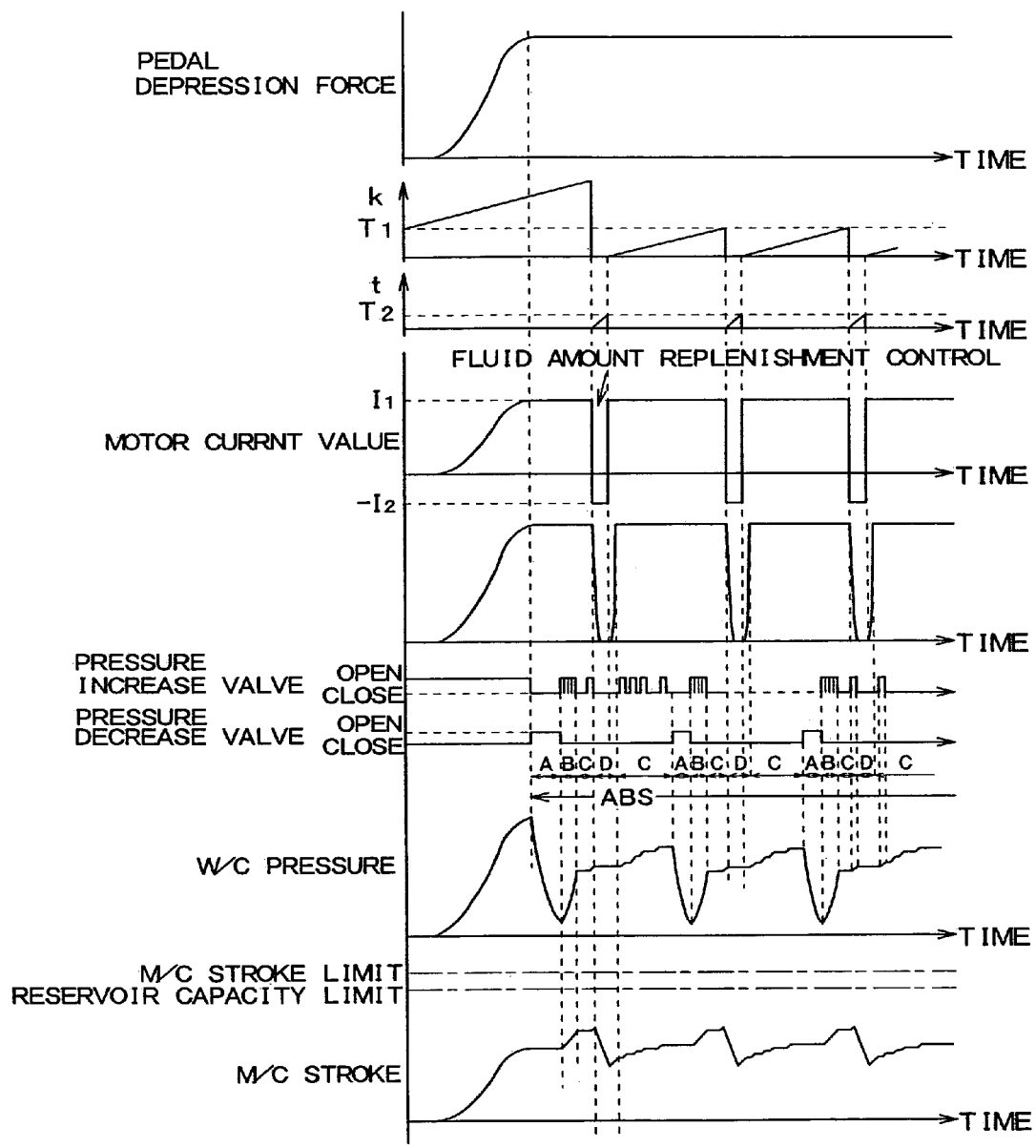
FIG. 7 is a time chart showing operation of the motor-driven brake device according to the third and the fourth embodiment.

Next, a transitional operation flow of the third embodiment executed by the previously described processing will be explained based on a time chart of FIG. 7. In FIG. 7, each mode within the ABS control is indicated by (A), (B), and (C), and a period of the fluid amount replenishment control is indicated by (D).

Prior to depression of the brake pedal 1, the pressure increase valves 73a to 73d are in the opened state, and the pressure decrease valves 74a to 74d are in the closed state. The post-termination elapsed time k of the fluid amount replenishment system is successively incrementally increased as a result at 190 and the following processing. As long as the fluid amount replenishment control does not start, the value of the post-termination elapsed time k continues to increase even if k exceeds T1. When the brake pedal 1 is depressed, the motor 5 is driven due to the depression force indication current value in accordance with the depression force detection value so that thus the stroke of the M/C 4 is performed and the M/C pressure increases.

The W/C pressure of each wheel also increases in accordance with the increase in the M/C pressure, and thus braking force is generated with respect to each vehicle wheel. Then, the ABS control is started due to reduction of the vehicle wheel speed and increase in the slip ratio. Along with starting of the ABS control, (A) the pressure decrease mode, (B) the pressure increase control mode, and (C) the pulse pressure increase/maintenance mode, described above, are successively executed. If the post-termination elapsed time k exceeds the predetermined value T1 during the pulse pressure increase/maintenance mode, the fluid amount replenishment control starts. In the example shown in FIG. 7, the initial fluid amount replenishment control executed following the start of the ABS control, is started at the time point when the pulse pressure increase/maintenance mode is terminated. However, the time count of the post-termination elapsed time k exceeds T1 substantially and thus the fluid amount replenishment control is immediately started though a starting point slightly delays in FIG. 7. From the second execution onwards, the fluid amount replenishment control is started when the time count of the post-termination elapsed time k reaches T1.

When the fluid amount replenishment control is started, the reverse rotation command value −I2, which is a current value for reverse rotation, is applied to the motor 5 when the replenishment execution time t equals T2. Accordingly, the M/C stoke returns, namely, the M/C stroke length becomes smaller, and, shortly after this, the M/C pressure is reduced in a short time period.

Due to the return of the M/C stroke, brake fluid stored in the reservoirs 75a and 75b during execution of the pressure decrease mode, recirculates to the primary chamber 4b and the secondary chamber 4c of the M/C 4 via the check valves 76a and 76b. Accordingly, the fluid amount of each of the chambers 4b and 4c is replenished.

When the time counter of the execution time t exceeds T2 the fluid amount replenishment control terminates and the motor current value is switched to the depression force indication current value in accordance with the depression force. Since the brake pedal 1 remains depressed, namely, the brake force is at a maximum value, the current value I1 that was utilized prior to the start of the fluid amount replenishment control is returned to, and this current value I1 drives the motor 5. Accordingly, the piston rod 4d is pushed in the direction that increases the length of the M/C stroke, and M/C pressure is generated.

Along with termination of the fluid amount replenishment control, the counter value of the post-termination elapsed time k for the replenishment control is increased by an increment of 1 (at 190), and the counter value of the execution time t for the replenishment execution time is reset to zero (at 220). Following this, at 190 and the following routine thereof are repeated, and when the time counter value of the post-termination elapsed time k exceeds T1, the fluid amount replenishment control is executed.

Accordingly, in the third embodiment, braking (increase of the W/C pressure), slip ratio increase, pressure decrease mode (A), pressure increase control mode (B), pulse pressure increase/maintenance mode (C), fluid amount replenishment control (D), pulse pressure decrease/maintenance mode (C), slip ratio increase; pressure decrease mode (A), and so on are executed in the ABS control. Therefore, even if the ABS control is continued for a long time period, it is possible to prevent amounts of the reservoirs 75a and 75b from reaching limit of storage capacity due to W/C pressure decrease. Thus, it is possible to inhibit the ABS control from becoming inoperable.

In the motor-driven brake system, depression of the brake pedal 1 and reciprocation of the piston of the M/C 4 are isolated from each other. Accordingly, even when the driver maintains depression of the brake pedal 1 in order to continuously generate braking force for each of the vehicle wheels, it is possible to appropriately return the M/C stroke. In addition, by returning brake fluid to the M/C 4 from the reservoirs 75a and 75b, it is possible to continue the ABS control.

Fourth Embodiment

Next, a fourth embodiment according to the present invention will now be explained with reference to the drawings. The fourth embodiment is a motor-driven brake device in which the present invention has been applied to a pumpless ABS device. In particular, the motor-driven brake device differs from that of the second embodiment in that a fluid amount replenishment control for replenishing brake fluid is executed by returning brake fluid to an M/C by returning an M/C stroke in a short-period in the pulse pressure increase/maintenance mode. The fourth embodiment is the same as the third embodiment with respect to the control logic of the fluid amount replenishment control.

Accordingly, the fourth embodiment only differs from the second embodiment with respect to control logic. The overall structure of the fourth embodiment is the same as that shown in FIG. 3, which was previously described. Thus, structural elements that are the same as those in the second embodiment are denoted by the same reference numerals and their explanation is omitted here.

As can be seen from FIG. 3, the fourth embodiment is provided, like the second embodiment, with the brake pedal 1, the stroke simulator 2, the depression force sensor 3, the M/C 4, the motor 5, the gear mechanism 6, the ABS actuator 72, the W/Cs 8a to 8d, the ECU 10, and the vehicle wheel speed sensors 11a to 11d. However, the ECU 10 executes the same fluid amount replenishment control as the third embodiment, and is thus different to the second embodiment in this respect. The ABS control operation is the same as that described above for the first to the third embodiments, and thus an explanation will be omitted here.

Next, operation of the fourth embodiment will be explained with reference to the flow chart of FIG. 6 and the time chart of FIG. 7. This explanation will focus on points of difference from the third embodiment.

The control logic of the ABS control of the fourth embodiment is the same as that of the previously described embodiment and thus an explanation will be omitted here. Reduction of the W/C pressure is executed by switching the pressure decrease valve 74a in the opened state and returning brake fluid to the master reservoir 4e, as in the second embodiment.

Figure 6:
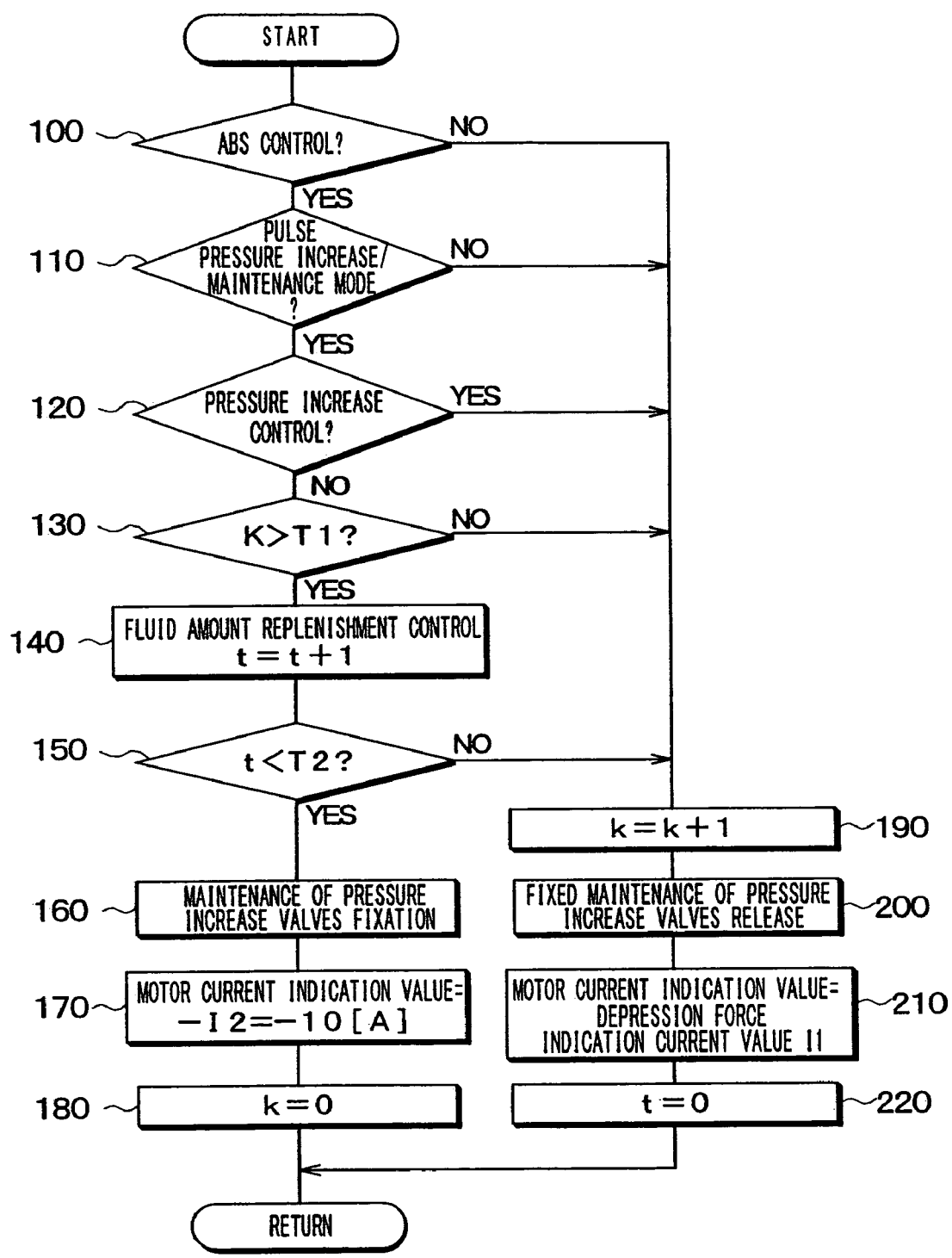
FIG. 6 is a flow chart showing processing executed by the motor-driven brake device according to the third and the fourth embodiments of the present invention.

The fluid amount replenishment control is the same as that of the third embodiment, and processing is executed according to the flow chart shown in FIG. 6. The fluid amount replenishment control is executed such that, during the pulse pressure increase/maintenance mode (C), the four pressure increase valves 43a to 43d are placed in the maintained state (close), the motor 5 is reverse rotated for the predetermined time T2, and thus the length of the M/C stroke is made smaller. However, one point difference from the third embodiment is that replenishment of brake fluid to the primary chamber 4b and the secondary chamber 4c of the M/C 4 is executed using the master reservoir 4e when the M/C stroke length has become smaller due to the fluid amount replenishment control.

When the fluid amount replenishment control terminates, the motor 5 pushes the piston rod 4d based on the depression force indication current value in the direction that causes the length of the M/C stroke to increase. Thus, the M/C pressure is generated.

Accordingly, in the fourth embodiment, braking (increase of the W/C pressure), slip ratio increase, pressure decrease mode (A), pressure increase control mode (B), pulse pressure increase/maintenance mode (C), fluid amount replenishment control (D), pulse pressure decrease/maintenance mode (C), slip ratio increase; pressure decrease mode (A), and so on are executed during the ABS control. Therefore, even if the ABS control is continued for a long time period, it is possible to prevent the M/C 4 from bottoming-out due to the M/C stroke returning in the short time period, and it is also possible to inhibit the ABS control from becoming inoperable.

In addition, the fourth embodiment is configured from the so-called open circuit in which brake fluid utilized to generate the W/C pressure is recirculated to the master reservoir 4e subject to atmospheric pressure. Accordingly, no limit exists to decrease the W/C pressure, and thus it is possible to prevent the ABS control from becoming inoperable due to the W/C pressure decrease becoming impossible, even if the ABS control is executed for a long time period.

In the motor-driven brake system, depression of the brake pedal 1 and reciprocation of the piston of the M/C 4 are isolated from each other. Accordingly, even when the driver maintains depression of the brake pedal 1 in order to continuously generate braking force for each of the vehicle wheels, it is possible to appropriately return the M/C stroke, and thus it is also possible to continue the ABS control.

Fifth Embodiment

Next, a fifth embodiment according to the present invention will now be explained with reference to the drawings. The fifth embodiment is a motor-driven brake device in which the present invention has been applied to a pumpless ABS device. In particular, the fifth embodiment differs from the third embodiment in that the execution period T2 for M/C stroke return during the fluid amount replenishment control and the current indication value I2 of the motor 5 are variably controlled in accordance with the size of the M/C stoke. Accordingly, the overall structure of the fifth embodiment is the same as that of the third embodiment, and thus explanation will be omitted here.

In the fifth embodiment, when a length (L) of the M/C stroke length (L) during braking becomes equal to or more than a predetermined value, a return amount (which corresponds to the current indication value I2 of the motor 5) and a return time (which corresponds to T2 ) of the M/C stroke are determined in accordance with a size of the length L of the M/C stroke.

First, a principle that is used for calculation to estimate the length L of the M/C stroke during braking will be explained.

An output fluid pressure of the M/C 4 is estimated using motor thrust force obtained based upon the motor current value I1. Then, the M/C stroke is calculated based on an acceleration speed of the M/C piston 4a calculated from a difference between the estimated fluid pressure and an actual M/C pressure P.

This is represented by an equation of motion for the M/C piston 4a as shown in equation 1:

$$[(I1 \times K - M) - (J+j) \times \alpha/R] \times \eta/R - (P \times A + f) = mp \times \alpha \quad (1)$$

where,
- I1: motor current value (variable)
- K: motor torque constant
- J: motor inertia moment (constant)
- M: motor friction torque (constant)
- R: reduction gear ratio=piston stroke/motor rotation angle (constant)
- η: reduction gear efficiency (constant)
- j: reduction gear inertia moment (constant)
- P: M/C output fluid pressure (variable)
- A: M/C cylinder cross-sectional area (constant)
- mp: M/C piston mass (constant)
- f: M/C piston friction resistance+M/C return spring return force (constant)
- α: M/C piston acceleration speed.

Accordingly, the left side of the equation is equivalent to a difference between the estimated output thrust force of the motor and the actual M/C output fluid pressure P.

The motor current I1 and the M/C output fluid pressure P are detected and the acceleration speed a is calculated using equation 1. Based upon an initial condition that the length L of the M/C stroke equals zero when time τ equals zero, the length L of the M/C stroke during the braking operation can be calculated, by integrating the acceleration speed α twice with respect to time using a following equation 2:

$$L = \int\int \alpha d\tau \quad (2)$$

(note that, τ and L are zero at a start of pedal)

Further, the actual M/C output fluid pressure P is generated by driving of the motor 5 resulting from the depression force indication current value determined in accordance with the depression force detection value of the depression force sensor 3. Accordingly, the actual M/C output fluid pressure P can be calculated from the depression force detection value. Further, respective output pressures of the primary chamber 4b and the secondary chamber 4c may alternatively be detected directly using a pressure sensor, not shown, for utilizing as the M/C output fluid pressure P.

Next, a control flow executed by the ECU 10 will be explained with reference to FIG. 8.

The control flow starts when the ignition switch is turned on, and is executed with a predetermined calculation period (e.g., 10 to 20 ms). First, at 300 it is determined whether braking is presently being executed. This determination is based on the signal from the depression force sensor 3. If NO is determined, L=0 is set at 460, and the processing returns to 300. If YES is determined, the processing moves to 310.

At 310 it is determined whether the ABS control is presently being executed. In this case, as with the first to the fourth embodiments, it is determined that the ABS control is being executed when the slip ratio calculated by the ECU 10 exceeds the pre-set target slip ratio. If NO is determined, the processing moves to 400. If YES is determined the processing moves to 320.

At 320 it is determined, whether the pulse pressure increase/maintenance mode is being executed with respect to all four wheels. This determination is executed by determining whether the slip ratio is in a state prior to reaching the target slip ratio following termination of the pressure increase control mode. If NO is determined, the processing moves to 400. If YES is determined, the processing moves to 330.

At 330, it is determined whether the pressure increase control mode is being executed. This determination is executed by determining whether the increase ratio of each of the wheel speeds, namely, the vehicle wheel acceleration speed, is equal to or above the predetermined value. If YES is determined, the processing moves to 400 since the pressure increase control mode is being executed and the fluid amount replenishment control is not executed. If NO is determined, the processing moves to 340. As a result of performing at 330, it is possible to increase the W/C pressure even if the M/C pressure decrease due to the M/C stroke returning during the pressure increase control.

At 340, it is determined whether the execution time t of the fluid amount replenishment control is zero, namely, whether the execution time t is reset. If NO is determined, the processing moves to 360, and if YES is determined the processing moves to 350.

At 350, it is determined whether the length L of the M/C stroke calculated by the equation 2 exceeds a threshold value KL. The threshold value KL can be preset as, for example, a value that corresponds to 60% of the M/C stroke limit (maximum stroke length). In the case that the determination result is NO, the fluid amount replenishment control is not required and thus the processing moves to 400. If the determination result is YES, the processing moves to 360 in order to execute the fluid amount replenishment control.

At 400, the execution time T2 of the fluid amount replenishment control and the motor current I2 for stroke return when executing the fluid amount replenishment control that relate to the length L of the M/C stroke are read from a preset map, and then temporarily stored. Accordingly, the stored value is updated for every calculation period.

At 410, the fluid amount replenishment control is not executed, and thus the maintained state of the pressure increase valves 73a to 73d of the four wheels is released, or in other words, fixing of the closed state is released. At 420, the current indication value of the motor 5 is set to the depression force indication current value I1 calculated by the ECU 10 based on the depression force detection value from the depression force sensor 3. Therefore, the motor 5 is driven, a stroke of the M/C piston 4 is performed, and the M/C pressure is generated in accordance with the depression force. Then, at 430, the replenishment control execution time t is reset.

On the other hand, at 360, the fluid amount replenishment control is executed and thus an increment of 1 is added to the replenishment control execution time t. Next, at 370, it is determined whether the replenishment control execution time t is smaller than a predetermined time T2. The predetermined time T2 is the value calculated and stored immediately before at 400. If the determination result is NO, namely, t is larger than or equal to T2, the processing moves to 410 and the normal ABS control is executed. If the determination result is YES, namely, t is less than T2, the fluid amount replenishment control is continued and the processing moves to 380.

At 380, the pressure increase valves 73a to 73d of the four wheels are fixed in the closed state, namely, a maintained state, and at 390, the current indication value of the motor 5 is set to −I2. The command value −I2 is set to the value calculated and stored immediately before at 400. Therefore, the motor 5 is reverse rotated by current of −I2 [A] and the M/C stroke returns. Accordingly, brake fluid stored in the reservoirs 75a and 75b, respectively, can be returned to the primary chamber 4b and the secondary chamber 4c via the check valves 76a and 76b.

Next, at 440, variables (the motor current, the M/C output fluid pressure) and constants (the motor and transmission constants, mechanical loss, M/C characteristics data) that are necessary for the calculation of equation 1 are read. Then, at 450, the length L of the M/C stroke is calculated using the equation 2, and then processing returns to 300 and is repeated as mentioned above.

Due to the aforementioned processing, it is possible to executed the fluid amount replenishment control such that, for each calculation period, a present length L of the M/C stroke at each time point is estimated based on the difference between the thrust force of the motor 5 and the actual M/C output fluid pressure, and return current for the motor 5 for executing the fluid amount replenishment control and a respective time period thereof are calculated based on the length L of the M/C stroke.

It should be noted that according to the fifth embodiment the present length L of the M/C stroke (stroke of the master piston 4a of the M/C 4) is calculated by estimation using the motor current and the M/C pressure. However, as will be described later with relation to FIG. 10, a stroke sensor 9 may be provided for detecting the M/C stroke by estimating displacement of the piston 4a with respect to the gear mechanism 6. Accordingly, a detection value from the stroke sensor 9 may be input to the ECU 10 and may be directly used as the length L of the M/C stroke, instead of utilizing the equation 2.

Figure 8:
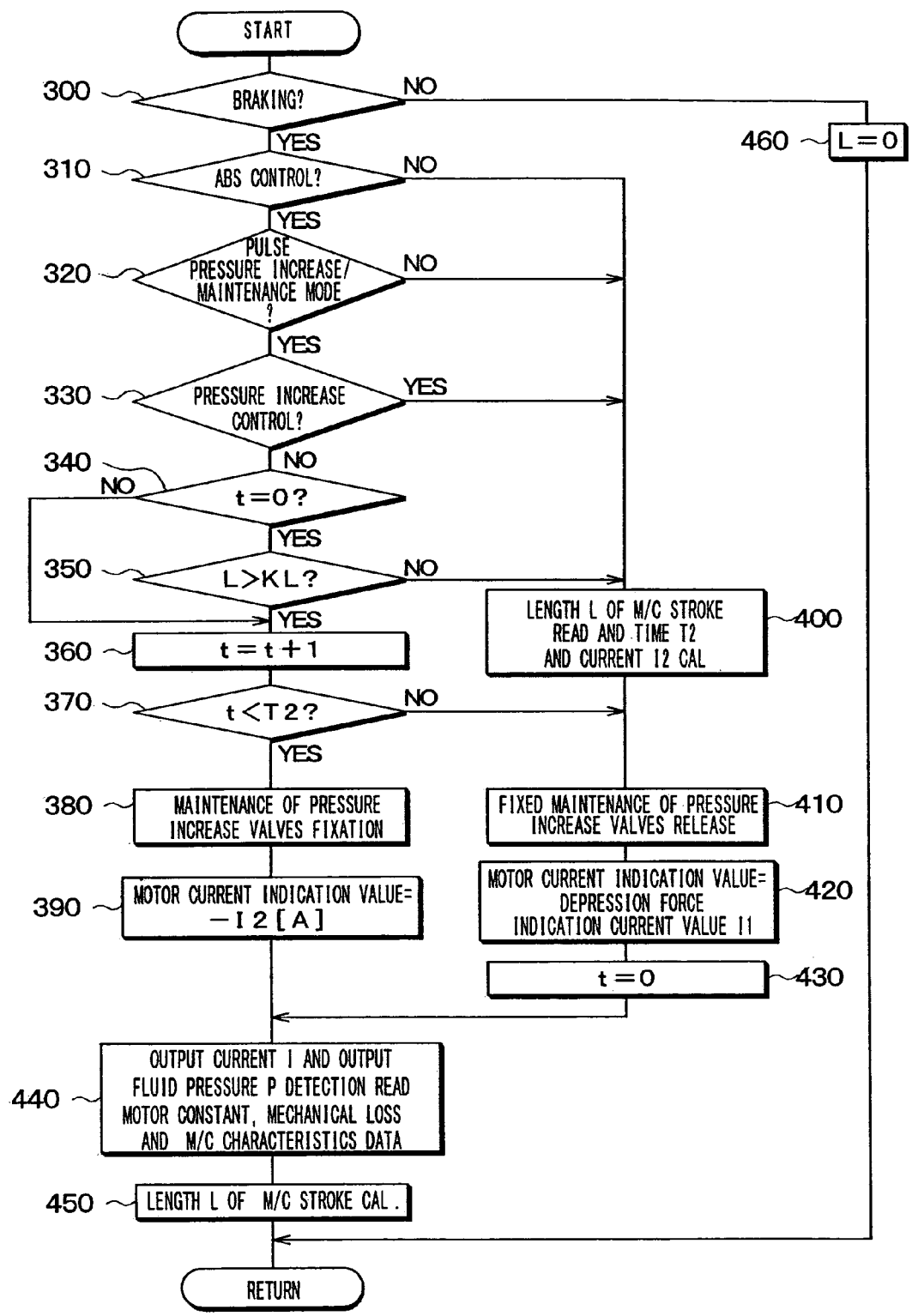
FIG. 8 is a flow chart showing processing executed by the motor-driven brake device according to the fifth embodiment.

Accordingly, in the case of the control flow, it is possible to omit processing at 440 and at 450 of FIG. 8. Further, it is possible to improve the accuracy of the length L of the M/C stroke, or in other words, to raise the accuracy of the fluid amount replenishment control.

Sixth Embodiment

Next, a sixth embodiment according to the present invention will now be explained with reference to the drawings. The sixth embodiment, like the fourth embodiment, is a motor-driven brake device in which the present invention has been applied to a pumpless ABS device that directly returns brake fluid, which has reduced pressure due to a pressure decrease valve, to a master reservoir subject to atmospheric pressure. In particular, the sixth embodiment differs from the fourth embodiment in that the execution time t and the motor current indication value I2 for returning the stroke during the fluid amount replenishment control are variably controlled according to a consumed fluid amount resulting from execution of the ABS control, namely, a fluid amount discharged from the W/Cs 8a to 8d. The consumed fluid amount is estimated based on information concerning the opened state of the pressure decrease valves 74a to 74d. Accordingly, the overall structure of the sixth embodiment is the same as that of the fourth embodiment (and the second embodiment) shown in FIG. 3, and thus an explanation will be omitted here.

In the sixth embodiment, during braking, the fluid amount replenishment control is executed such that the consumed fluid amount (hereinafter referred to as "consumed fluid amount" or "discharged fluid amount") discharged from the W/C is calculated based on an average fluid pressure of the four wheels estimated based on a vehicle deceleration speed, and an opened time of the pressure decrease valve, the return amount (the return current of the motor 5) and a return time of the M/C stroke is determined in accordance with the consumed fluid amount in the case that this consumed fluid amount is equal to or more than a predetermined value.

First, an estimation method for the consumed fluid amount during the ABS control will be explained.

During pressure decrease of the ABS control, an equation of motion for each of the four wheels is established as shown in an equation 3:

$$G \times W \times S - K \times PW = m \times g \quad (3)$$

where,

G: vehicle deceleration speed (variable)

W: vehicle weight (constant or variable)

g: wheel acceleration speed of each wheel (variable)

S: braking force distribution between each of the wheels (e.g., each wheel having equal braking force quarter of entire braking force) (variable)

K: braking force coefficient of each wheel (braking force/fluid pressure) (constant)

PW: W/C pressure of each wheel m: inertial mass of wheel system

R: coefficient of flow velocity of the pressure decrease valve (flow velocity/pressure differential) (constant)

T: opened time of the pressure decrease valve (variable).

The W/C pressure PW of each wheel is calculated by detecting the vehicle deceleration speed G and the wheel speed acceleration g of each wheel, and utilizing the above equation.

Next, the opened time T of the pressure decrease valve is totaled, and a discharged fluid amount Q resulting from the opening of the pressure decrease valve is calculated using an equation 4.

$$Q=R\Sigma(T \times PW) \quad (4)$$

Based on the concept of replenishing the discharged fluid amount Q using the fluid amount replenishment control (D) that returns the M/C stroke, a return stroke length ΔL is calculated using an equation 5, in which the M/C cylinder cross-sectional area is A.

$$\Delta L=Q/A \quad (5)$$

Figure 9:
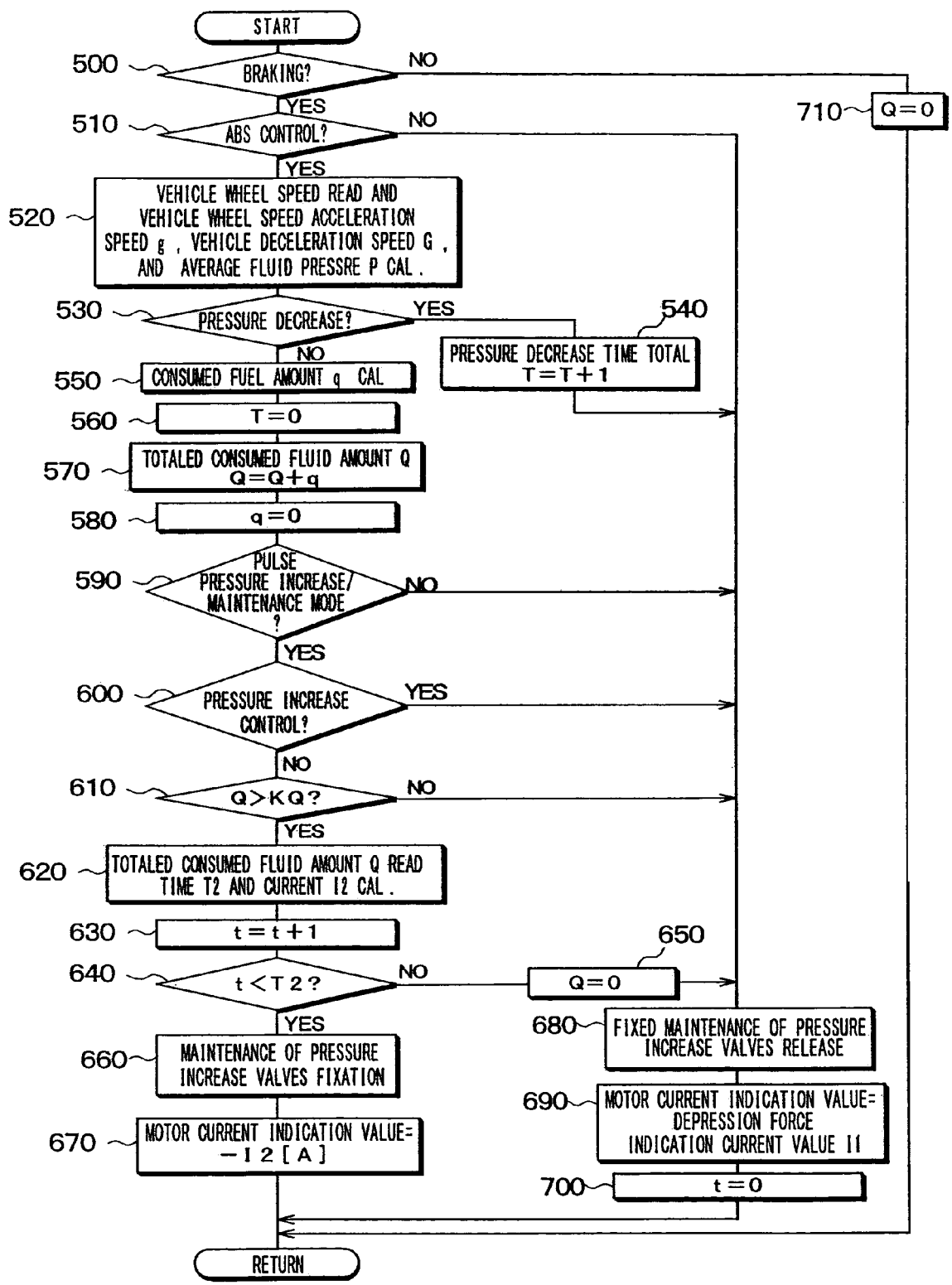
FIG. 9 is a flow chart showing a processing executed by the motor-driven brake device according to the sixth embodiment.

Next, a control flow executed by the ECU 10 will be explained with reference to FIG. 9.

When the ignition is turned on, the control flow starts and is then repeatedly executed with a predetermined calculation period. First, at 500, it is determined whether braking is presently being executed. This determination is based on the signal from the depression force sensor 3. If NO is determined, Q=0 is set at 710, and the control flow returns to 500. If YES is determined, the control flow moves to 510.

At 510 it is determined whether the ABS control is presently being executed. In this case, as with the first to fifth embodiments, it is determined that the ABS control is being executed when the slip ratio calculated by the ECU 10 exceeds the pre-set target slip ratio. If NO is determined, the control flow moves to 680. If YES is determined, the control flow moves to 520.

At 520, reading of the vehicle wheel speed and calculation of the vehicle deceleration speed, these respective speeds being necessary for the equations 3 and 4, are executed. Then, calculation of the average value PW of the W/C pressure of the four wheels is executed using the equation 3. Next, at 530, it is determined whether pressure decrease is presently being executed based on an energization state of each of the pressure decrease valves 74a to 74d. If YES is determined, at 540, an increment of 1 is added to the opened time (pressure decrease time) T of the pressure decrease valves 74a to 74d. If NO is determined, the control flow moves to 550.

At 550, a consumed fluid amount q, which has been consumed by discharge up to that point, is read from a pre-set map, using the pressure decrease time T up to that point and the average value PW of the W/C pressure of the four wheels. This map is stored in advance in the ECU 10, instead of using calculation based on the equation 4.

Next, at 560, the pressure decrease time T is reset to zero, and at 570, the totaled value Q of the consumed fluid amount is calculated by adding the consumed fluid amount q (Q=Q+q). Following this, the consumed fluid amount q is reset at 580.

Next, at 590, it is determined whether the pulse pressure increase/maintenance mode is being executed with respect to all four wheels. This determination is executed by determining whether the slip ratio is in a state prior to reaching the target slip ratio following termination of the pressure increase control mode. If NO is determined, the control flow moves to 680. If YES is determined, the control flow moves to 600.

At 600, it is determined whether the pressure increase control mode is being executed. This determination is executed by determining whether the increase ratio of each of the wheel speeds, namely, the vehicle wheel acceleration speed, is equal to or above the predetermined value. If YES is determined, the control flow moves to 680 since the pressure increase control mode is being executed. If NO is determined the processing moves to 610. As a result at 600, it is possible to increase the W/C pressure even if the M/C pressure decreases due to the M/C stroke returning during the pressure increase control.

At 610, it is determined whether the totaled consumed fluid amount Q calculated at 570 exceeds a preset threshold value KQ. If NO is determined, the control flow moves to 680 since fluid amount replenishment control is not required. If YES is determined, the control flow moves to 620 in order to execute the fluid amount replenishment control.

At 620, the execution time T2 of the fluid amount replenishment control and the motor current I2 for stroke return when executing the fluid amount replenishment control that relate to the totaled consumed fluid amount Q are read from a preset map, and then temporarily stored. Then, at 630, an increment of 1 is added to the execution time t of the fluid amount replenishment control, and at 640, it is determined whether the execution time t is smaller than the execution time T2 obtained from the map at 620. If NO is determined, namely, t is equal to or greater than T2, the control flow moves to 650. If YES is determined, namely, t is less than T2, the processing moves to 660 and the fluid amount replenishment control is continued.

At 660, the pressure increase valves 73a to 73d of the four wheels are fixed in the closed state, namely, the maintained state, and at 670, the current indication value of the motor 5 is set to −I2. The command value −I2 is set to the value that was calculated and stored immediately before at 620. Therefore, the motor 5 is reverse rotated at the current of the command value −I2 for the execution period P2, and the M/C stroke is returned. Accordingly, it is possible to return brake fluid sufficient to replenish the totaled consumed fluid amount Q to the primary chamber 4b and the secondary chamber 4c from the master reservoir 4e.

On the other hand, when the replenishment control execution time t exceeds T2, the integrated consumed fluid amount Q is reset at 650, and the control flow moves to 680.

Processing from 680 to 700 is the control flow for the ABS control when the fluid replenishment control is not executed. The processing is the same as that from 200 to 220 (refer to FIG. 6) of the third and the fourth embodiments. At 680, the closed state, namely, the maintained state which fixes pressure, of the pressure increase valves 73a to 73d of the four wheels is released, or in other words, the pressure increase valves 73a to 73d are set so as to be free to move between opened state and closed state. At 690, the current indication value of the motor 5 is set to the depression force indication current value I1 determined in accordance with the depression force detection value. At 700 the execution time t of the fluid amount replenishment control is reset to zero, and then the processing returns to 500 and is repeated as mentioned above.

As a result of the previously described processing, for each calculation period, the vehicle deceleration speed G and the vehicle wheel acceleration speed g are calculated based on the output values of the respective vehicle speed sensors 11a to 11d. Based on these calculated values, the average W/C pressure PW for each wheel is estimated using the equation 3, and then the consumed fluid amount Q of the brake fluid discharged from the W/Cs 8a to 8d of each wheel is calculated based upon the average W/C pressure PW and the pressure decrease time. In addition, when the consumed fluid amount Q exceeds the predetermined value KQ, the motor 5 is reverse rotated based upon the return current value I2 and the return time T of the motor 5 which are determined in accordance with the consumed fluid amount Q. Therefore, the M/C stroke is returned, and it is possible to replenish the consumed fluid amount Q to the primary chamber 4b and the secondary chamber 4c of the M/C 4 from the master reservoir 4e.

Seventh Embodiment

Next, a seventh embodiment according to the present invention will now be described with reference to the drawings. The seventh embodiment is a motor-driven brake device to which the present invention is applied. In particular, the seventh embodiment differs from the fourth embodiment in that the fluid amount replenishment control, which is the same as that of the fourth embodiment (i.e., the M/C stroke return is executed, the M/C pressure is increased and an appropriate W/C pressure is obtained) is executed when it is determined that air is mixed with the M/C according to a detection value attained by detecting the actual M/C stroke.

Figure 10:
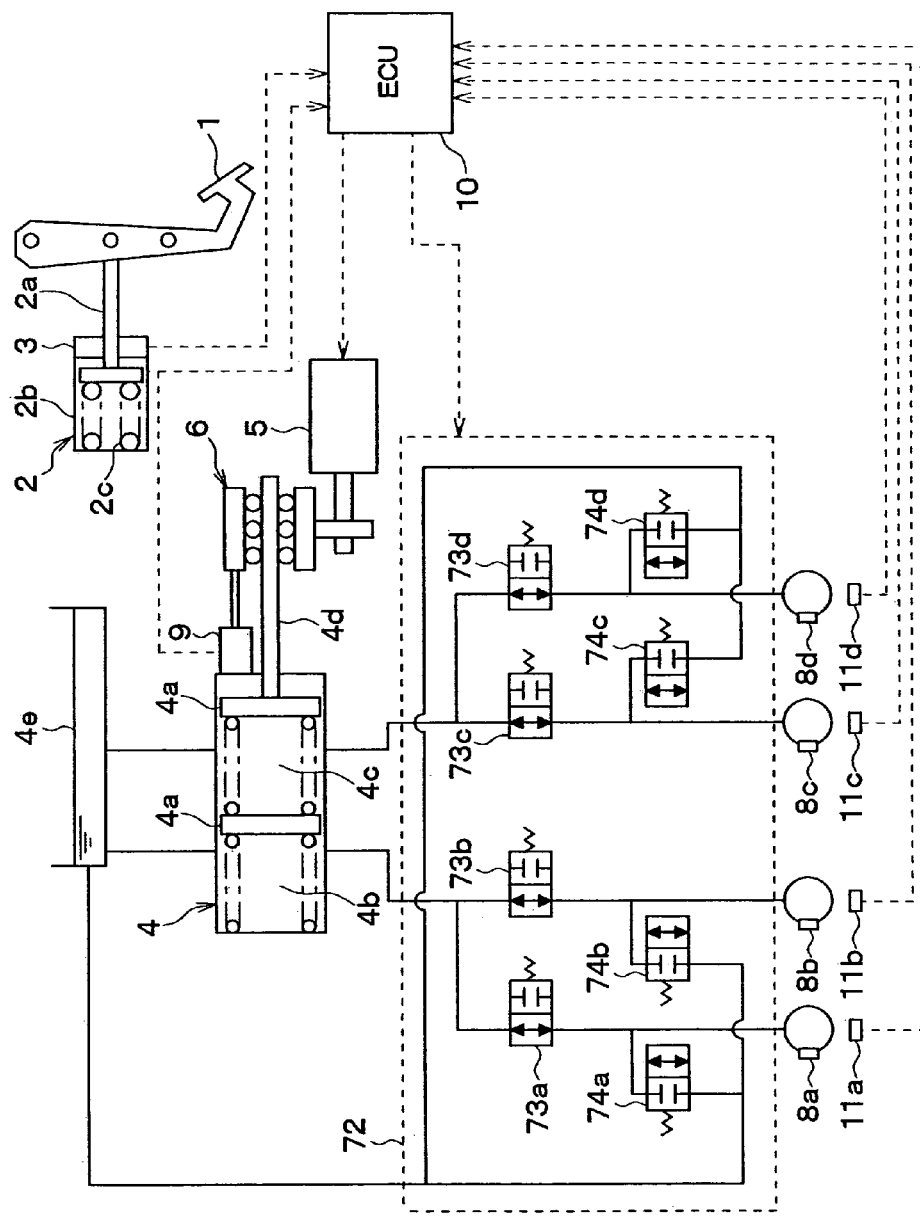
FIG. 10 is a schematical view showing an overall structure of a motor-driven brake device according to a seventh embodiment of the present invention.

The seventh embodiment, as can be seen from an overall structure shown in FIG. 10, differs from the second, the fourth, and the sixth embodiments shown in FIG. 3, in that the stroke sensor 9 is provided that detects the stroke of the M/C 4. Other than this, structural elements of the seventh embodiment that are the same as those in the previous embodiments are denoted by the same reference numerals. An explanation of such structural elements is omitted here. It should be noted that according to the seventh embodiment the fluid amount replenishment control is executed independently from the ABS control and thus an explanation of the ABS control will be omitted here.

The stroke sensor 9 detects the M/C stroke by estimating displacement of the piston 4a with respect to the gear mechanism 6. The detection value is then input to the ECU 10.

Figure 11:
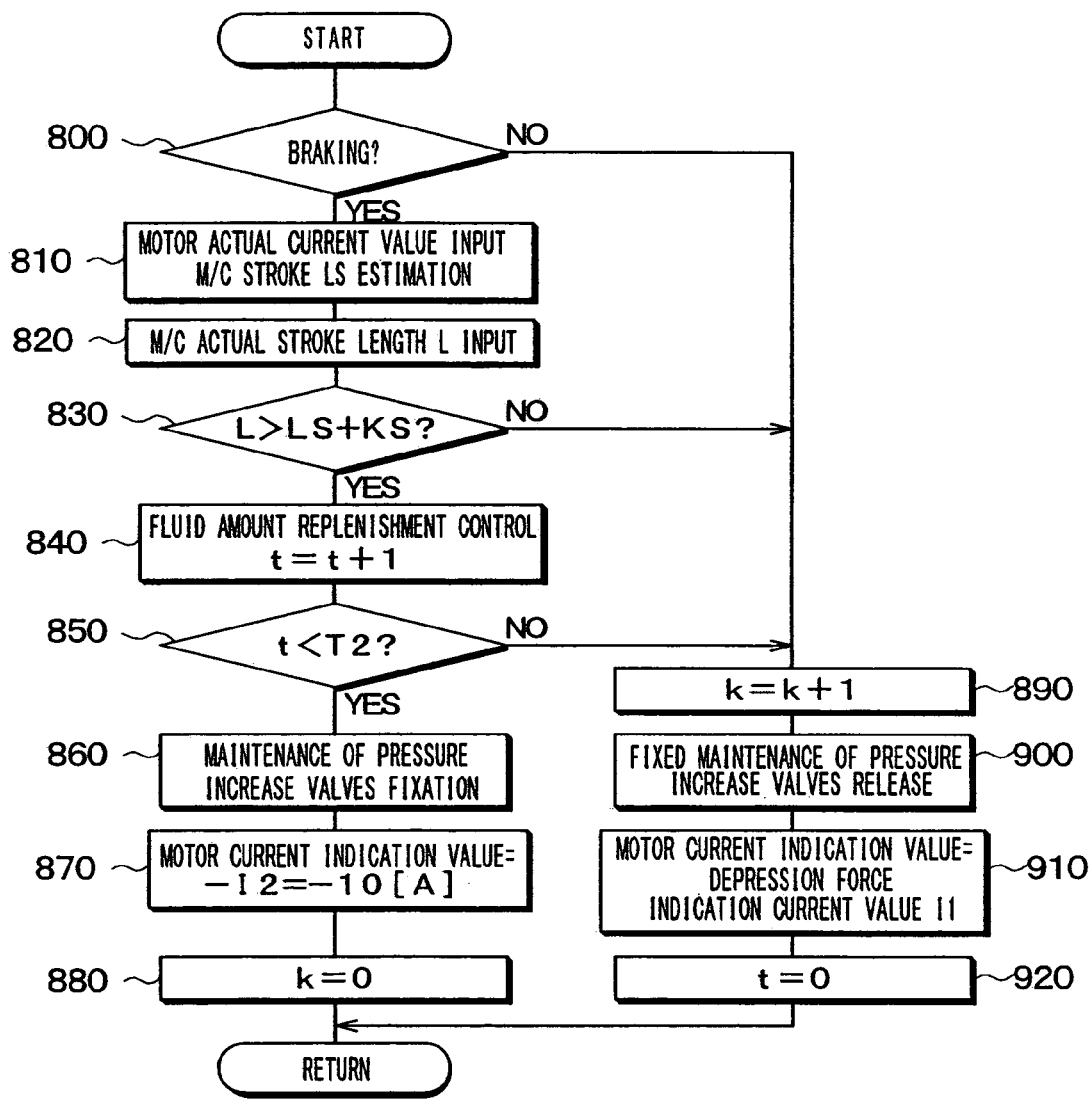
FIG. 11 is a flow chart showing processing executed by the motor-driven brake device according to the seventh embodiment.

Next, an M/C stroke return in the fluid amount replenishment control will be explained with reference to a flow chart of FIG. 11.

When an ignition switch of the vehicle is turned on, processing executed by the ECU 10 shown in the flow chart starts. A routine, described below, is then repeatedly executed with a predetermined calculation period (e.g., 10 to 20 ms).

First, at 800 it is determined whether braking is presently being executed. This determination is based on the signal from the depression force sensor 3. In the case that NO is determined, the routine moves to 890. In the case of YES, the routine moves to 810.

At 810 an actual current value of the motor 5 is read, and an estimated value LS of the M/C stroke is calculated from a preset map storing a relationship between the actual current value and the stroke stored in the ECU 10.

At 820, the actual length L of the M/C stroke is input based on the stroke sensor 9. Then, at 830, it is determined whether the actual length L of the M/C stroke is larger than the sum of the estimated value LS and a threshold value KS. The threshold value KS is preset in accordance with a state in which the M/C pressure becomes unable to exert a sufficient effect on the W/Cs 8a to 8d due to the difference between the actual length L of the M/C stroke and the estimated value LS becoming large in accordance with an amount of air mixed within the piping of the ABS actuator 72. In the case that the determination result is NO, the difference between the actual length L of the M/C stroke and the estimated value LS is small, and thus normal braking and the ABS control are executed by the routine moving to 890. If the determination result is YES, the difference between the actual length L of the M/C stroke and the estimated value LS is larger than the threshold value KS, and thus it is taken that air has been mixed in the conduit. Accordingly, as in the previous embodiments, the fluid amount replenishment control, namely, return of the M/C stroke by reverse rotation of the motor 5 for a short period, is executed, by the routine moving to 840.

At 840, the fluid amount replenishment control is continued and thus an increment of 1 is added to the replenishment control execution time t.

Processing from 850 to 880 is the same as that from 150 to 180 in the third and the fourth embodiments. At 850, it is determined whether the replenishment control execution time t exceeds the predetermined time T2. If NO is determined, namely, that t is equal to or greater than T2, it is taken that the fluid amount replenishment control is terminated and the routine moves to 860. If YES is determined, namely, t is less than T2, the routine moves to 860 and the fluid amount replenishment control is continued.

At 860, the pressure increase valves 73a to 73d of the four wheels are fixed in the closed state, namely, the maintained state, and at 870, the current indication value of the motor 5 is set to −I2. This command value −I2 is, for example, set to around 10 [A], and thus the motor 5 is reverse rotated by a current of −10 [A] and the M/C stroke is returned. Accordingly, the M/C stroke is returned by reverse rotation of the motor 5. Accordingly, it is possible to reliably transmit the M/C pressure to each of the W/Cs 8a to 8d by replenishing brake fluid within the conduit by sucking brake fluid that has been stored in the master reservoir 4e to the primary chamber 4b and the secondary chamber 4c. This operation, normally, allows realization of an effect that is equivalent to a pumping operation of the brake pedal 1 when air is mixed in the conduit.

At 880 the post-termination elapsed time k of the fluid amount replenishment control is reset to 0, and the routine returns to 800 and is repeated as mentioned above.

On the other hand, at 890, which is executed while the fluid amount replenishment control is not being operated, an increment of 1 is added to the post-termination elapsed time k of the fluid amount replenishment control. At 900, the maintained state which fixes pressure of the pressure increase valves 73a to 73d of the four wheels is released, or in other words, the pressure increase valves 73a to 73d are set so as to be free to move between opened state and closed state. At 910, the current indication value of the motor 5 is set to the depression force indication current value I1 determined in accordance with the depression force detection value. At 920, the execution time t of the fluid amount replenishment control is reset to zero, and then the routine returns to 800 and is repeated as mentioned above.

Accordingly, when the difference between the actual length L of the M/C stroke detected by the stroke sensor 9 and the stroke length LS estimated from the current value of the motor 5 is larger than the threshold KS, a pumping operation of the motor-driven brake device is possible through repeated execution of the fluid amount replenishment control in which the M/C stroke return is executed by the return current I2 and the return time T2 of the motor 5. Even in the case that air is mixed within the brake piping, it is possible to reliably transmit the M/C pressure to each of the W/Cs 8a to 8d.

MODIFICATIONS

According to the aforementioned fifth embodiment, the motor-driven brake device that executes the pumpless ABS control using the closed circuit derives the return current and the return time of the motor 5 for occasions of executing the fluid amount replenishment control as the estimated value calculated from the stroke length of the M/C 4, or the detection value of the sensor 9. Further, the return current and the return time are variably controlled in accordance with the stroke length. However, the present invention is not limited to this. The same closed circuit as is shown in FIG. 5 may be modified such that the consumed fluid amount discharged during pressure decrease from the pressure decrease values 74a to 74d is calculated, and the return current and the return time of the motor 5 for the fluid amount replenishment control are variably controlled such that consumed fluid amount is replenished, as was the case with the sixth embodiment.

Further, according to the aforementioned sixth embodiment, the motor-driven brake device that executes the pumpless ABS control using the open circuit variably controls the return current and the return time of the motor 5 when executing the fluid amount replenishment control in accordance with the calculated value of the consumed fluid amount discharged during pressure decrease from the pressure decrease values 74a to 74d, such that the consumed fluid amount is replenished. However, the present invention is not limited to this. The open circuit shown in FIG. 3 may be modified such that the return current and the return time of the motor 5 for the fluid amount replenishment control are variably controlled in accordance with the length of the M/C stroke, the length being derived as the estimated value of the length of the M/C stroke or the detected value of the sensor 9, as was the case with the fifth embodiment.

In addition, according to the aforementioned seventh embodiment, the open circuit of the motor-driven brake device replenishes brake fluid to the M/C using the fluid amount replenishment control, when the difference between the detected value of the actual M/C stroke and the estimated value of the M/C stroke is large. Further, according to the seventh embodiment, even in the case that air is mixed within the brake conduit, it is possible to reliably transmit the M/C pressure to the W/Cs 74a to 74d. However, the present invention is not limited to this. The closed circuit shown in FIG. 4 may be modified such that the fluid amount replenishment control is executed with respect to air mixed in the conduit, according to the difference between the detected value and estimated value of the M/C stroke, as was the case with the seventh embodiment.

While the above description is of the preferred embodiments of the present invention, it should be appreciated that the invention may be modified, altered, or varied without deviating from the scope and fair meaning of the following claims.

What is claimed is:

1. A vehicular motor-driven brake device comprising:
    a pedal operation amount detection portion for detecting an operation amount of a brake pedal;
    an actuator that moves a rod in accordance with the operation amount of the brake pedal;
    a master cylinder having a piston which generates a master cylinder pressure that draws brake fluid from a master reservoir as a result of reciprocation caused by movement of the rod, wherein the stroke length of the piston of the master cylinder is set so as to be larger than a depression amount of the brake pedal;
    a wheel cylinder for generating braking force to a vehicle wheel using a wheel cylinder pressure that is generated based on the master cylinder pressure;
    a pressure increase valve provided in a conduit that connects the master cylinder and the wheel cylinder for regulating the master cylinder pressure so as to output the wheel cylinder pressure;
    a pressure decrease valve connected to the wheel cylinder for regulating the wheel cylinder pressure and discharging brake fluid in accordance with decrease of the wheel cylinder pressure;
    a storage reservoir for storing brake fluid discharged by the pressure decrease valve, when the wheel cylinder pressure decreases;
    a check valve disposed between the storage reservoir and the master cylinder for permitting flow from the storage reservoir to the master cylinder, wherein brake fluid in the storage reservoir only returns to the master cylinder from the storage reservoir via the check valve based on a pressure difference between the brake fluid pressure in the storage reservoir and the master cylinder; and
    a control portion for outputting respective drive signals to the actuator, the pressure increase valve and the pressure decrease valve.

2. The vehicular braking device according to claim 1, wherein a capacity of the reservoir is set to a capacity that equals a capacity of the master cylinder minus a capacity of the wheel cylinder and a capacity of the conduit connecting the master cylinder and the wheel cylinder.

3. The vehicular motor-driven brake device of claim 1, wherein the storage reservoir is an accumulator.

* * * * *